United States Patent [19]

Lisson et al.

[11] Patent Number: 5,341,312
[45] Date of Patent: Aug. 23, 1994

[54] METHOD FOR ASSESSING AND CORRECTING INDIVIDUAL COMPONENTS OF A NON-MONOLITHIC IMAGING ASSEMBLY

[75] Inventors: Jerold B. Lisson, Henrietta; Darryl I. Mounts, Pittsford; Dale K. Mack, Rochester, all of N.Y.

[73] Assignee: Eastman Kodak Company, Rochester, N.Y.

[21] Appl. No.: 766,232

[22] Filed: Sep. 26, 1991

[51] Int. Cl.$^5$ .............................. G02B 27/10
[52] U.S. Cl. .................... 364/525; 359/223
[58] Field of Search ............ 364/525; 359/223

[56] References Cited

U.S. PATENT DOCUMENTS

| | | | |
|---|---|---|---|
| 4,505,585 | 3/1985 | Yoshikawa et al. | 364/525 |
| 4,641,256 | 2/1987 | Marchegiano et al. | 364/525 |
| 4,692,027 | 9/1987 | MacGovery et al. | 364/525 |
| 4,768,881 | 9/1988 | Jüptnet et al. | 364/525 |
| 4,791,584 | 12/1988 | Greiveukamp, Jr. | 364/525 |
| 4,848,907 | 7/1989 | Yokokura et al. | 364/525 |

*Primary Examiner*—Jack B. Harvey
*Assistant Examiner*—Thomas Peeso
*Attorney, Agent, or Firm*—Thomas H. Close

[57] ABSTRACT

A method for assessing and correcting individual components of a non-monolithic imaging assembly. The method has an advantage of expanding an applicability of a classical optical transfer function, heretofore a measure only of a global monolithic imaging device performance, so that it can provide information for correcting the non-monolithic imaging assembly in terms of local area modifications.

3 Claims, 21 Drawing Sheets

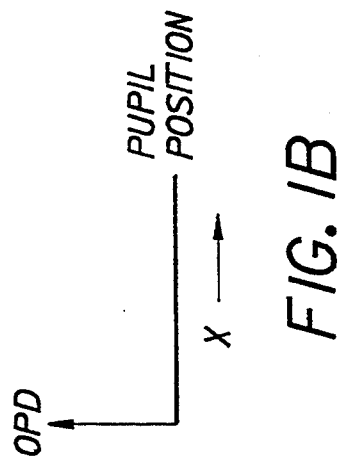
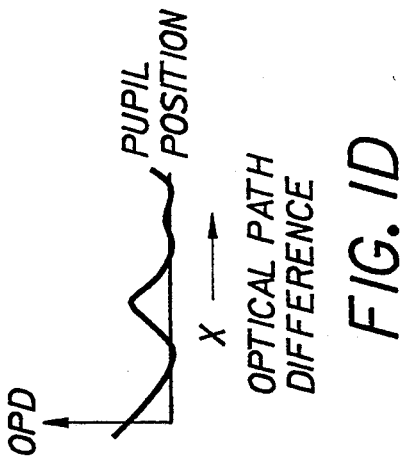
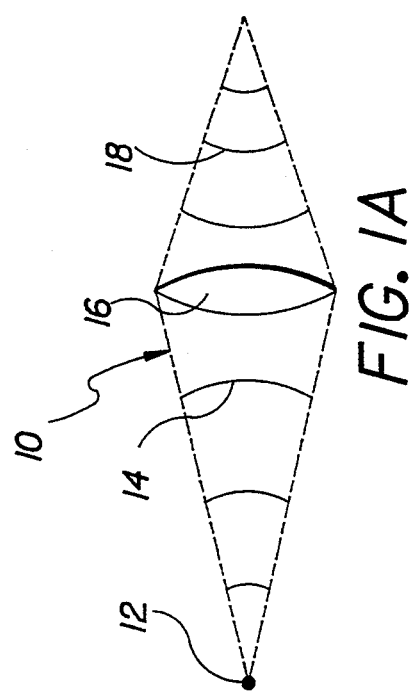
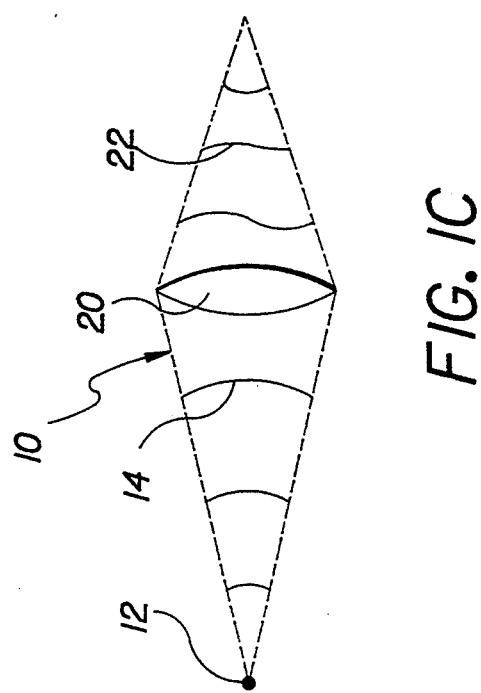

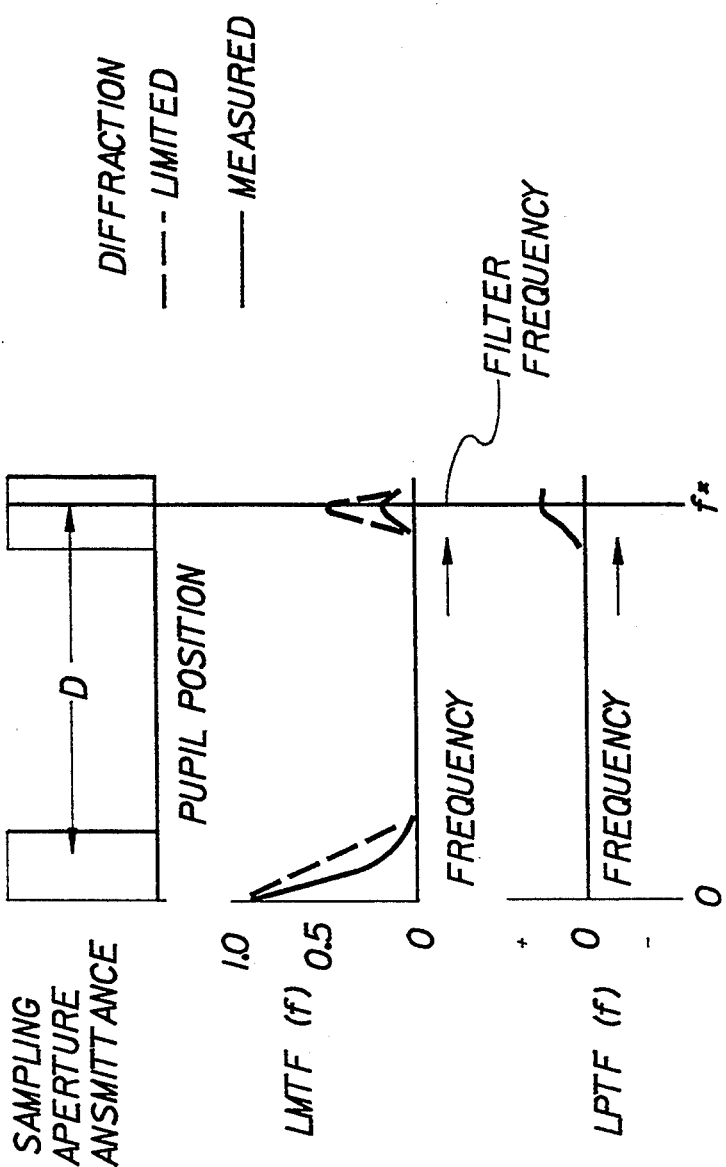

SAMPLE APERTURE SEPERATION=D
SPATIAL FREQUENCY=λZ/D

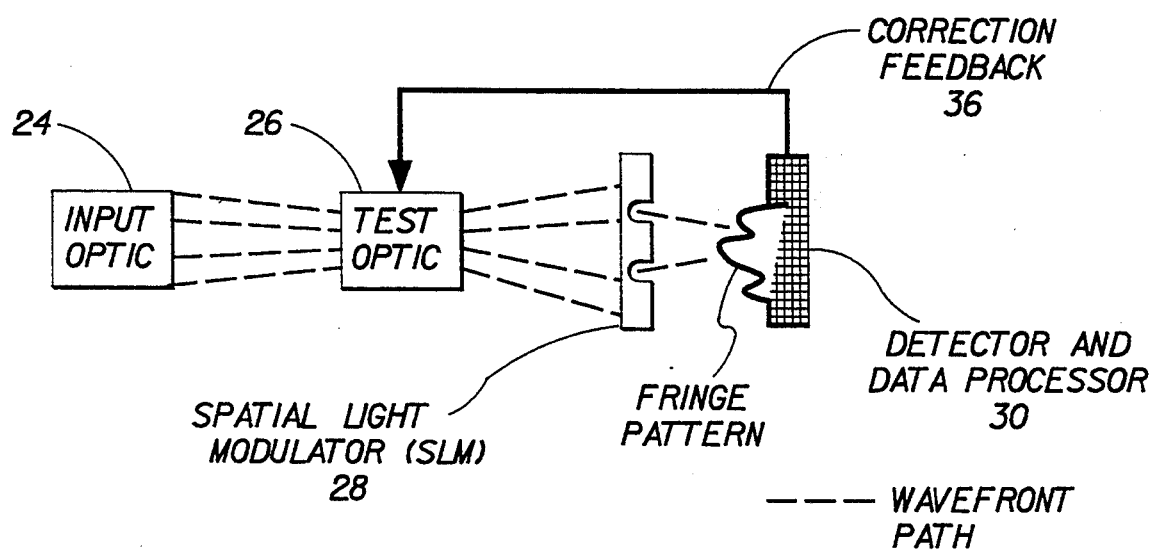
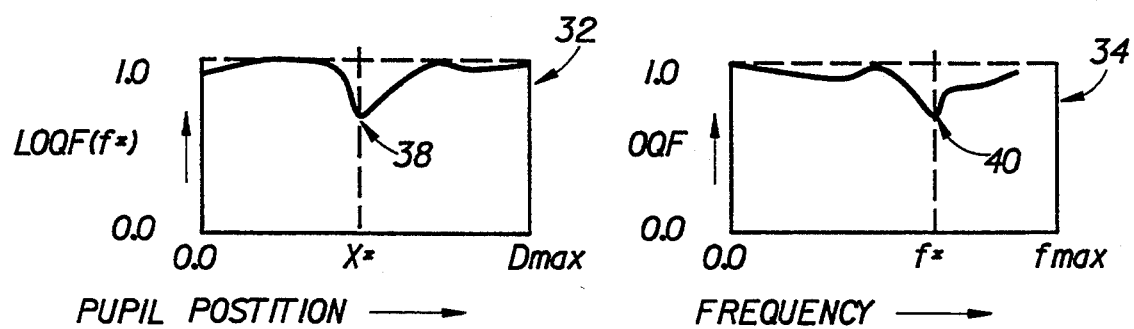
FIG. 8

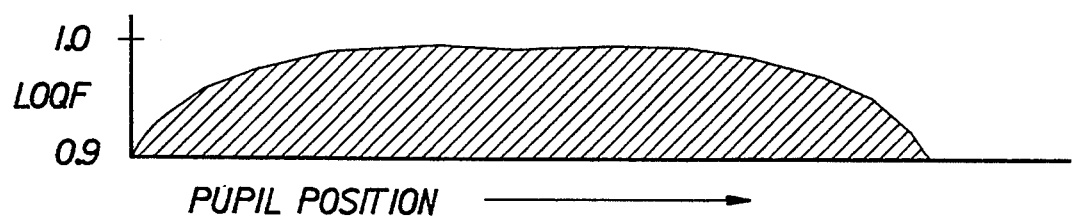
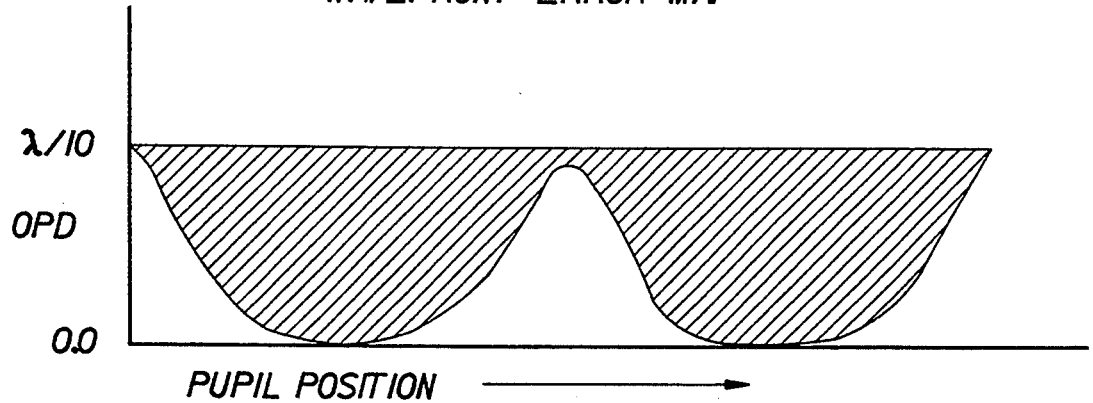
FIG.12

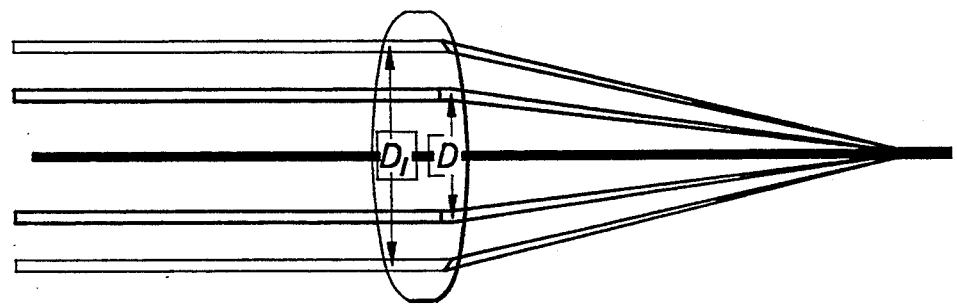
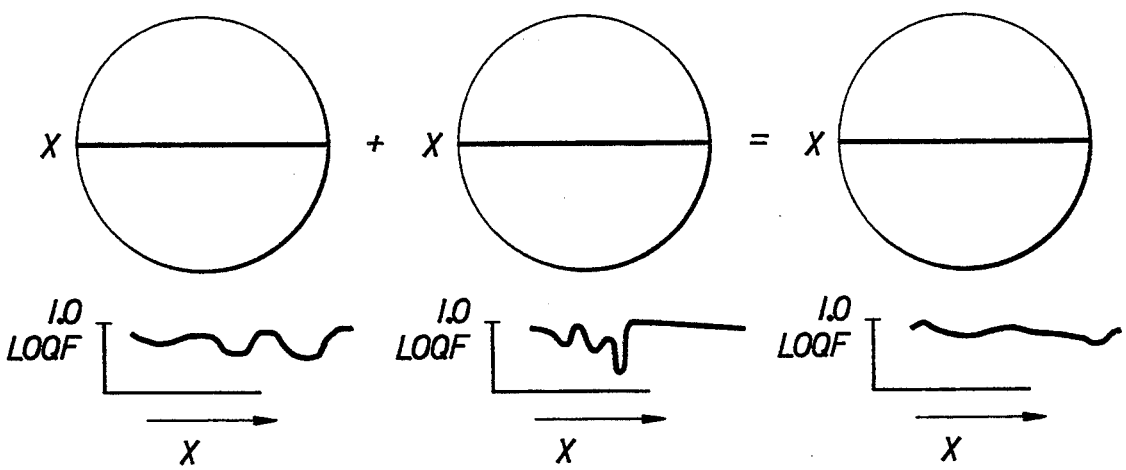
| FREQUENCY 1 | FREQUENCY 2 | WEIGHTED SUM |
| $(f_1^x = D_1 / z \lambda)$ | $(f_2^x = D_2 / z \lambda)$ | OF FREQUENCIES 1 AND 2 |
FIG.16

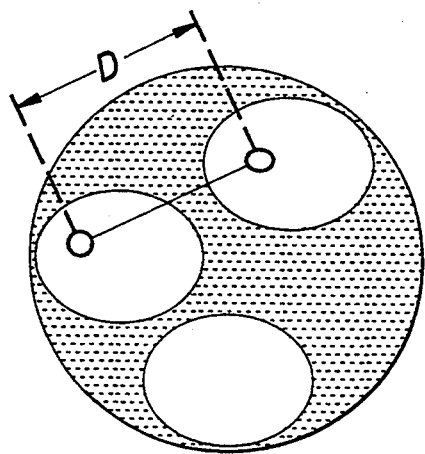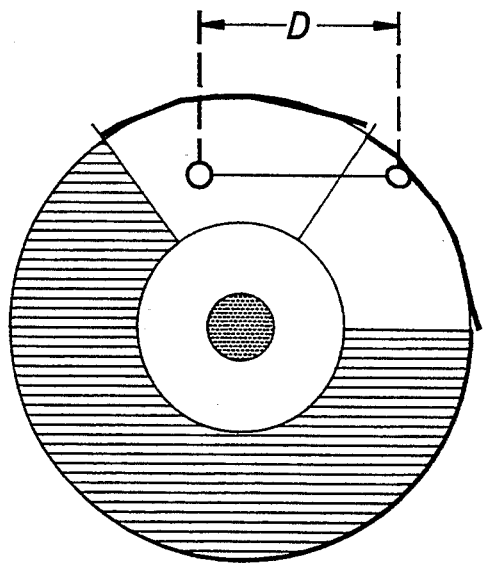
DILUTE APERTURE SYSTEM
SEGMENTED SYSTEM
FIG. 17A
FIG. 17B

SUBPUPIL ARRIVAL
TIME Ta

INTRA-SUBPUPIL LWPA
SAMPLING AT fd

SUBPUPIL ARRIVAL TIME Ta    SUBPUPIL ARRIVAL TIME Tb

INTRA & INTER-SUBPUPIL LWPA
GEOMETRIC INCREASE, f d

SUBAPERTURE TEST TIME Ta    SUBAPERTURE TEST TIME Tb

INTER-SUBPUPIL LWPA
GEOMETRIC INCREASE, f d 2

LOQF SAMPLE ESTIMATE OF OQF
RANDOM SAMPLING OF AZIMUTHAL
DIRECTION AT FREQUENCY f*

LOQF-CPDF

PARTITIONED FULL APERTURE

METHOD FOR ASSESSING AND CORRECTING INDIVIDUAL COMPONENTS OF A NON-MONOLITHIC IMAGING ASSEMBLY

BACKGROUND OF THE INVENTION

This invention relates to a method for assessing the optical quality of an imaging assembly comprising multiple components, and in particular, for providing feedback correction to the imaging assembly based on this assessment.

INTRODUCTION TO THE INVENTION

Attention is first directed to FIGS. 1A–D, which show an optical system 10 and waveforms that may be used to explain the concept of assessing the optical quality of a monolithic imaging device.

The FIG. 1A optical system 10 includes a source of radiation comprising a point source 12 that can output a radiation beam 14; and, an imaging device comprising a conventional monolithic lens 16. The lens 16 can image the radiation beam to generate an exit pupil imaged beam 18.

In a first case, it may be assumed that the FIG. 1A imaging device comprising the lens 16 is ideal. For this first case, accordingly, the point source 12 can output a radiation beam comprising divergent spherical waves, which divergent spherical waves, in turn, may be imaged by the ideal lens 16 to generate convergent spherical waves.

Since the FIG. 1A lens 16 is assumed to be ideal, it does not introduce wavefront errors, which would otherwise deform the sphericity of the convergent waves. Therefore, a FIG. 1B graph of optical path difference (OPD) error, from assumed perfect sphericity, as a function of exit pupil position (X), is a straight line congruent with the abscissa, i.e., a constant error of zero.

In a second case, it may now be assumed that the imaging device is not ideal. For example, as shown in FIG. 1C, a lens 20 may have inherent defects, such as a trefoil or coma, so that in the presence of the point-source, the lens 20 generates at its exit pupil a wavefront 22 that departs from ideal sphericity. Accordingly, for this second case, a graph of optical path difference (OPD) error, from idealized perfect sphericity, as a function of exit pupil position (X), is of the type illustratively shown in FIG. 1D.

(Note that the FIGS. 1B, D graphs of OPD error may be sensed, i.e., generated, by conventional techniques, including Michelson, e.g., Twyman-Green interferometry, or Foucault knife-edge testing.)

SUMMARY OF THE INVENTION

The FIGS. 1B, D graphs of OPD error are one measure of the optical quality of the imaging device. The graphs may be generated for the following purpose. Namely, it has been historically understood that:

(1) one may first mathematically interrogate the global OPD error function for its root mean square (RMS), or variance, or standard deviation, or Zernike polynomial curve fit, or peak to valley absolute difference, etc;

to an end secondly, (2) of ascertaining the type and the magnitude of an imaging device defect,
for the purpose thirdly, (3) of correcting the imaging device defect, for example, by way of a polishing or a surface smoothing technique applied to a surface element of the imaging device.

We have recognized a pervasive and profound problem with this three-step procedure. The problem stems from an inherent assumption, common to all of the cited theoretical mathematical interrogation techniques, which assess the optical quality of the imaging device on the basis of a global parameter, namely, the global OPD error function. Thus, the cited mathematical techniques, for example, the RMS approach, derive a wavefront error statistic from a function that has been initially developed over an entire (hence, global) imaging device exit pupil. (See Anderson et al, infra, Reference 1.)

Accordingly, for example, it can be the case that an indefinite number of different OPD error functions can have an identical RMS value, yet, at the same time, have a different impact on imaging performance, so that there may be no direct correlation between minimizing a particular computed RMS value, on the one hand, and providing, on the other hand, a corresponding maximization of global imaging performance through a reduction of local OPD error. Indeed, it can be the case that the imperfect correlation can reduce the imaging performance when the local OPD errors are corrected on the basis of RMS minimization.

Restated, there may be no direct correlation between the global parameter (e.g., RMS) and a feedback instruction to a polisher or optician as to where, locally, on the imaging device, one should directly address or remove a specific, localized defect, based on an informed or prioritized mathematical calculation.

For this reason, lack of direct correlation between, on the one hand, global imaging performance and, on the other hand, informed and prioritized information on local imaging device defects, as derived from the FIG. 1D OPD error function, we have been prompted to investigate a second, independent mathematical approach to assessing the optical quality or imaging performance of an imaging device. This second mathematical approach is based on the classical optical transfer function (OTF) and a related optical quality function (OQF). (See Goodman, infra, Reference 2).

The optical transfer function is a global spatial frequency-dependent complex quantity, whose modulus is a modulation transfer function (MTF), and whose phase is a phase transfer function (PTF). The MTF is a measure of a reduction in contrast from object to image, for each spatial frequency passed by an imaging device. The PTF represents commensurate relative phase shift, for each spatial frequency passed by an imaging device. The optical transfer function may be expressed by an equation (1:

$$\text{OTF (freq.)} = \text{MTF (freq.)} \cdot e^{j \, PTF(freq.)} \quad (1)$$

The related global optical quality function (OQF) may be expressed by an equation (2):

$$OQF = \frac{\text{MTF (actual measurement) (freq)}}{\text{MTF (diffraction limited) (freq)}} \quad (2)$$
$$\text{(Perfect Imaging Device)}$$

As a tool for assessing the optical quality of an imaging device, the global OTF and the OQF have the following advantage, as compared to the above elaborated optical path difference (OPD) error technique. Namely, the global OTF and OQF are directly correlated to global imaging performance of an imaging device with arbitrary aberration distributions. Accordingly, the OTF and OQF have an advantage in that they can provide the immediate parameters of concern to customers of imaging devices and systems, since customers typically specify a minimum level of imaging performance as expressed explicitly by these parameters.

The advantage realized by the mathematical approach of the OTF and OQF, may be offset, however, when we point out that these global performance functions do not supply information for a corrective process in terms of required local area modifications. Restated, the OTF and OQF technique, much like the optical path difference (OPD) error criterion, may be limited in usefulness, because there is no way to map these inherently global parameters to performance loss due to discrete parts of an exit pupil.

We have now discovered (first aspect) a novel method for assessing the imaging quality or performance of an optical imaging device. The novel method has an important advantage of retaining all the virtues of the mathematical approach subsumed by the global optical transfer and quality functions, while entirely overcoming their heretofore offsetting limitations in terms of exclusivity vis-a-vis local mapping capabilities. The novel method has additional advantages, to be specified below, in terms of corrective actions-prioritization capabilities, and performance tailored modulation transfer function (MTF) specifications.

The novel method (first aspect) is suitable for use in an optical system comprising a source of radiation that can output a radiation beam; and, an imaging device to be tested, which imaging device can image the radiation beam. The steps of the novel method comprise:

a) sampling a pupil of the imaging device at at least two regions for assessing wavefront errors associated with the at least two regions; and b) computing a localized optical transfer function (OTF) for the localized wavefront errors.

We have also discovered (second aspect) a novel method for providing correction feedback in an optical system, the optical system comprising:

a source of radiation that can output a radiation beam; and, an imaging assembly to be corrected and which comprises at least two components, which imaging assembly can image the radiation beam;

the steps of the method comprising:

1) sampling a pupil of the imaging assembly at at least two regions for assessing wavefront errors associated with the at least two regions;

2) computing a localized optical transfer function (LOTF) for the localized wavefront errors;

the LOTF being defined by an equation:

$$\text{LOTF (freq.)} = \text{LMTF (freq.)} \times e^{(j)LPTF \text{ (freq.)}}$$

where

LOTF=Local Optical Transfer Function;
LMTF—Local Modulation Transfer Function;
LPTF—Local Phase Transfer Function;

3) generating from the LOTF a performance map comprising a) a local optical quality factor (LOQF) comprising a ratio $$\frac{\text{the computed } LMTF}{\text{a diffraction limited } LMTF};$$

and, b) the local phase transfer function (LPTF); and, 4) generating from the performance map correction feedback comprising inter-component difference errors, for applying a controlled action to at least one of the components.

BRIEF DESCRIPTION OF THE DRAWING

The invention is illustrated in the accompanying drawing, in which:

FIGS. 1A—D show an optical system and waveforms that may be used to explain the concept of assessing the optical quality of an imaging device;

FIGS. 3A–C show a basic LWPA sampling aperture transmittance function in 1-D form, generated in accordance with the steps of the present invention;

FIG. 8 is a generic illustration of an optical assembly comprising correction feedback developed in accordance with a method of the present

FIG. 12 shows a performance map vs. wavefront error map, derived from an example of the FIG. 11 flowchart process;

FIG. 16 shows performance maps derived in accordance with the hardware system;

FIGS. 17 A, B show a dilute aperture system and non-monolithic system of the present invention;

DETAILED DESCRIPTION OF THE INVENTION

Figure 2A:
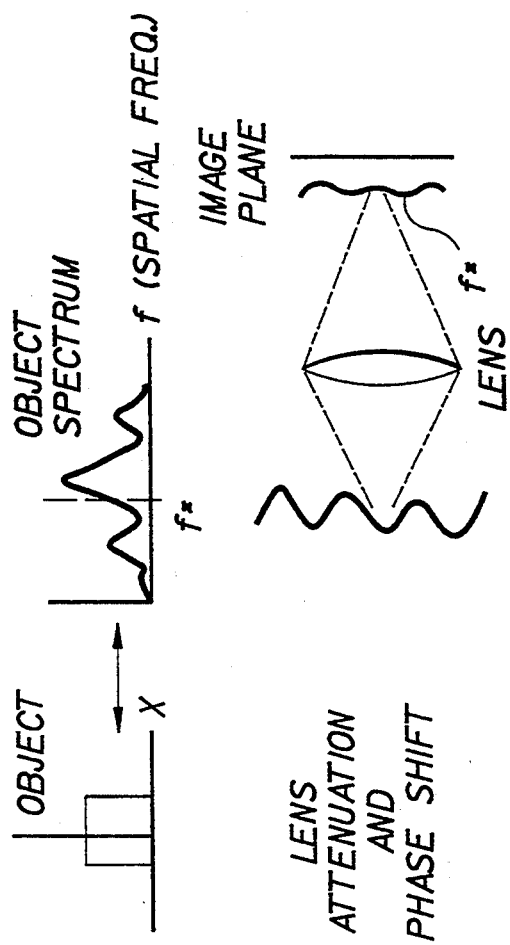
FIGS. 2A, B show schematics of a sampling step of the method of the present invention comprising object to image information transfer.

I. The Method Of The Present Invention In Terms Of An Assessment Capability

As summarized above, the first aspect of the novel method of the present invention can provide an assessment of the optical quality or performance of an imaging device. This assessment can be done in real time or, alternatively, through software designed to evaluate wavefront error maps from simulated models, or from the output of wavefront sensors.

The imaging device to be tested can comprise a conventional monolithic lens, or a monolithic mirror, or a diffraction grating, or a combination of these elements. Or, the imaging device can comprise an unconventional element, for example, a synthetic aperture comprising two or more monolithic apertures that can cooperate to function as a continuous single monolithic imaging device. The radiation source that inputs to the imaging device can comprise an extended source or a point source, and can be coherent, incoherent, or partially coherent.

The novel method comprises analysis of local wavefront performance, as developed over an exit pupil of an imaging device, as evaluated by the local optical transfer function (OTF). For this reason, the novel method may also be referenced as a Localized Wavefront Performance Analysis (LWPA) system.

In the LWPA system, only the local wavefront errors that are included in LWPA spatial frequency selective sampling apertures, are used in assessing performance of an imaging device. A performance map of a full system aperture may be generated when the apertures are used to sample the wavefront at an adequate number of local areas (i.e., in satisfaction of the classical and well known Nyquist sampling rate function). The wavefront error at each sample position can therefore now be prioritized, and corrected on a basis of its impact on overall imaging performance. Further, any remaining error residuals are now optimized, for minimal impact on imaging device performance.

Restating this last paragraph, but with more particularity, a LWPA system prioritization sequence evaluates an imaging device quality on a basis of a local optical quality function (LOQF) that is specific to discrete regions of an exit pupil defined by an imaging device. This information, in turn, may be used to generate a corresponding LOQF map over the entire exit pupil. An optician or polisher, or adaptive optical control system, can therefore now use this LOQF map, to maximize imaging performance, by correcting those localized wavefront error regions with the lowest local OQF values. The net result of this action of the novel method is to generate a substantially monotonic-type convergence to an acceptable performance, at a given spatial frequency, thus securing a performance tailored local modulation transfer function (LMTF).

The method of the present invention is based on a first principle that an arbitrary object can be constructed from a knowledge of its Fourier spatial components, and on a second principle that a spatial filter, utilizing two dilute apertures, can be used to extract selected spatial frequency information from the object.

The two principles provide an understanding for the first step of the first aspect of the present invention, namely, sampling an imaged beam (generated by an imaging device under test), by way of, for example, an opaque mask defining at least two apertures.

The at least two apertures may each comprise a geometric shape defining a rectangle or a star, but preferably comprise a circle or a square. The apertures can comprise areas of appreciable extent, for example, an appreciable percentage of the global exit pupil, or, in a limiting case, may comprise a pinhole dimensionality.

Attention is now directed to FIGS. 2 through 7, which are provided as heuristics to demonstrate preferred aspects of the steps of the method of the present invention in its first aspect.

A Lens Sampling Process, Object-To-Image

FIG. 2A symbolically shows an imaging process of the present invention, in terms of the Fourier transform theory, and with a one-dimensional object for an input signal. The two headed arrow indicates a Fourier transformation from the space domain (X) to the frequency domain (f). The spectrum of this FIG. 2A object is schematically shown as the well-known sinc function. A specification frequency ($f^*$) may be selected for performance evaluation in FIG. 2B, where a Young's two-slit aperture is shown sampling the image quality at a pupil position X1. The specification frequency is directly proportional to a distance D between the sample apertures, where $D = \lambda z f^*$, $\lambda$ is the light wavelength, and z the distance between the fringe observation and pupil planes.

This FIG. 2 example indicates how the LWPA apertures extract information on lens quality at critical (specification) spatial frequencies. The transform shown by the double headed arrow is, in general, complex, which indicates that input signal amplitude (fringe modulation depth) and phase contribute to the image quality. Local area X1's contribution to OQF is shown as the small black rectangle located at the $f^*$ frequency of the indicated OQF function. Multiple fringe patterns are obtained from the several pupil regions that are sampled. When they are superimposed, the composite fringe obtained from their superposition, is indicative of global performance at frequency $f^*$ (However, each sample when considered singly, is an estimate of its contribution to imaging quality degradation.)

Figure 2B:
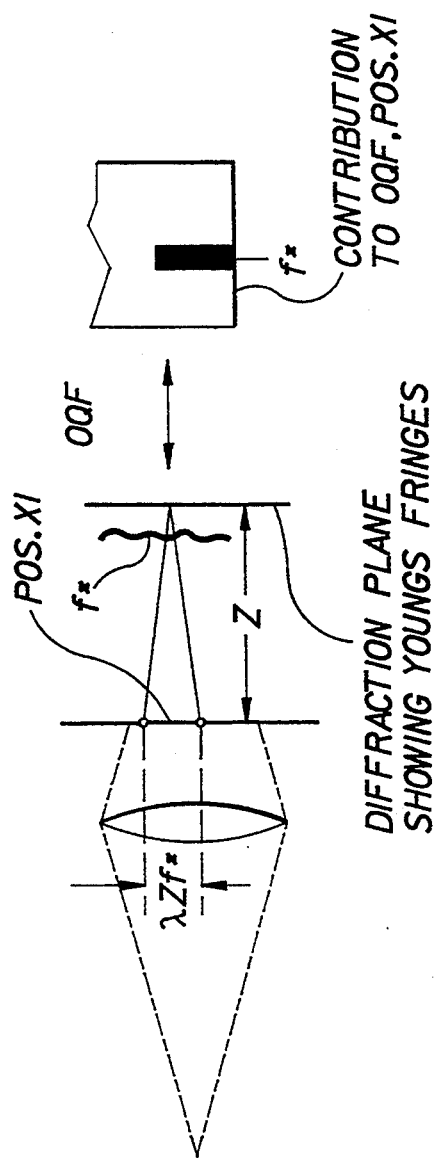

Global performance values over the total lens bandwidth are indicated by the solid line in the OQF plot of the FIG. 2B, and may be obtained by exploring the pupil with LWPA sample aperture sets having separation distances that cover the bandpass of interest. However, in developing the performance results for a specific spatial frequency, such as $f^*$, only a single fixed LWPA sample aperture separation distance is required. Each sampled position supplies fully redundant (constant separation distance) data in order to obtain a robust estimate of tile global performance loss for information transfer at a unique spatial frequency. (cf. this procedure to Rhodes et al, infra, Reference 3, where the object is the elimination of aberrations.)

(Note that in the LWPA process, it is assumed that a wavefront obtained during testing or performance assessment is supplied as input. In this case, the locally sampled signals are due totally to lens aberrations, and are not confounded by object phase variations. This is, indeed, the desirable condition for our purpose which involves lens performance assessment, and not image restoration, as in, for example, Russell et al, infra, Reference 4.)

Local-To-Global Performance Connection

The two-aperture sampling method, discussed earlier, can be considered as comprising a narrow-band filter that extracts from an input wavefront those error components that are of maximal importance for object information, transmitted at a specific spatial frequency. The LWPA system combines this operation of frequency selection with the operation of performance assessment. This may be accomplished by obtaining the OTF of the system defined by the two-aperture pupil and the local wavefront errors that are circumscribed therein. FIGS. 3A–C schematically present this critical concept. (See Reynolds et al, infra, Reference 5).

FIG. 3A presents the basic two-sample LWPA aperture transmittance function in a one-dimensional form. The distance between the two sample apertures (D) determines the filtered spatial frequency band of interest, in this case denoted f*. The local OTF result may be obtained by the autocorrelation of this complex pupil function, and gives the LMTF (FIG. 3B) and LPTF (FIG. 3C) components.

The dashed LMTF curve represents the diffraction limited case of no aberrations, the solid curve the aberration perturbed case. For a two aperture filter, the diffraction limited LMTF is always 0.5 at frequency f*. Note that the ratio of (LMTF (f*)-perturbed)/(LMTF(f*)-diffraction limited) is approximately 0.33 in the above example. This value represents the LOQF(f*) at the sampled pupil position. A correction at this position can increase the elemental performance at spatial frequency f* by a factor of about three.

The local OTF obtained from each sample location gives that region's differential contribution to full aperture imaging performance for an object spatial frequency that is directly related to the separation distance between the two apertures. This concept is schematically shown in FIG. 4.

Full Aperture Performance Synthesis Process

Figure 4:
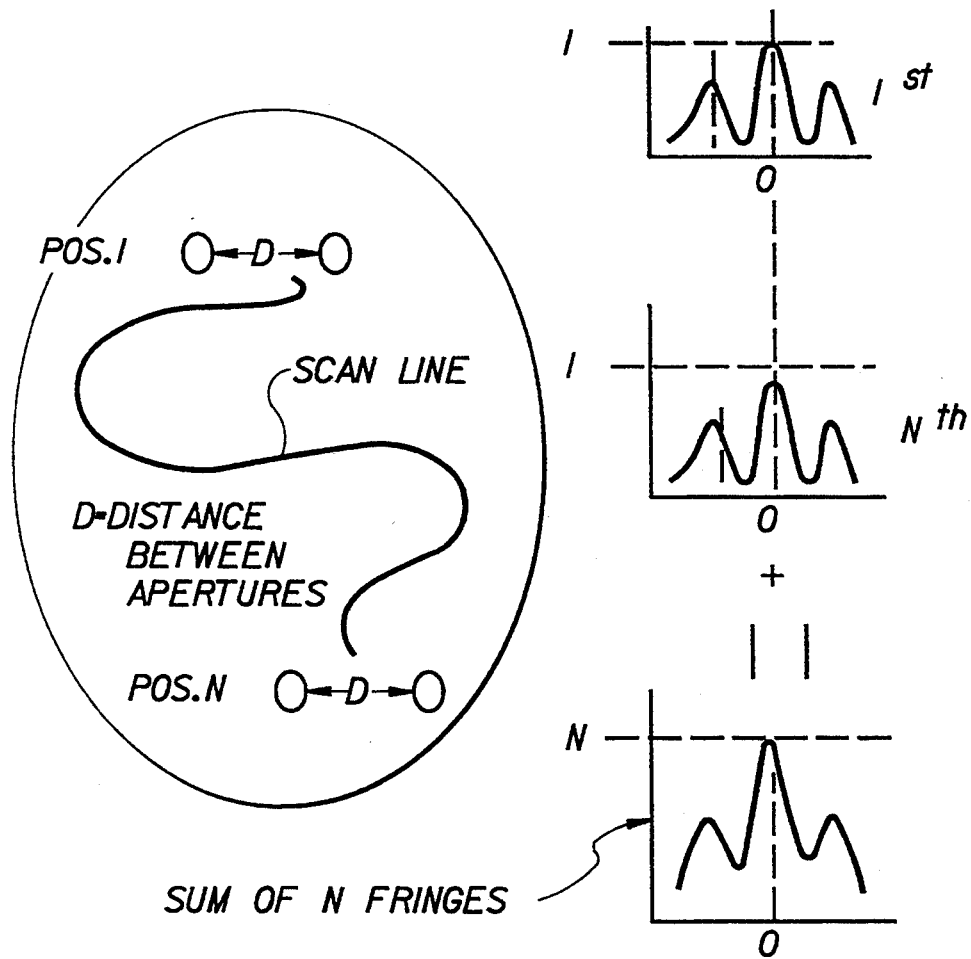
FIG. 4 demonstrates a full aperture performance synthesis process for a unique spatial frequency.

As shown in FIG. 4, the two apertures, separated by a distance D, give Young's fringes at the diffraction plane, for each sample position (1 through N). Local image quality loss is indicated by fringe contrast degradation (LMTF) due to local aberrations, or from phasing (LPTF) errors as indicated by translation of a main lobe from a reference position (zero (0) in figures). Such local aberrations can tend to reduce the composite fringe generated from the superposition of the N sample patterns of unit normalized amplitude. The resulting composite fringe is indicative of global quality.

In summary, FIG. 4 represents a schematic version of the situation for a perfect full aperture optic. In this case, the fringes from the N sample areas will have maximal amplitudes and be perfectly phased (exact alignment of all central lobes). This will result in a composite unattenuated fringe of maximal contrast of N. A key point in this development is that each pattern can be evaluated separately for its affect on full aperture performance. In essence, the Young's fringes form a linear system which allows superposition—the total effect due to the N local fringes is given by their superposition. This yields the desired connection between the local and full aperture performance.

LWPA uses a somewhat modified form of Young's interferometer, in that the sample apertures may be of appreciable extent. This expands the sensitivity of the system to any higher-order (2nd degree or higher) aberrations that are contained in the sample region, because they are nonlinear, and thus have a strong impact on the local fringe pattern quality and resulting local OQF.

A Fourier transform of the errors in the two sampling apertures gives the above fringe pattern in the far-field plane. A second transform gives the local OTF, the primary output. In the results presented herein, the local OTF values are computed directly from the autocorrelation of the wavefront errors circumscribed in the two sampling apertures.

In summary, the LWPA concept can be connected with the Young's aperture sampling of a wavefront and its transfer to the diffraction (image) plane. A direct sampling by two dilute apertures, separated by appropriate distances, gives the information necessary to obtain a local image quality in terms of critical specification frequencies. The performance at different pupil regions can be obtained with a generalized "Young's interferometer sampling process, in that finite area sampling apertures are used. An additional generalization may entail the use of more than two apertures, in order to obtain results pertinent to several spatial frequencies simultaneously (multi-band spatial frequency filtering). (See Indebetouw et al, infra, Reference 6).

Experimental Data

Figure 5A:
FIGS. 5A, B show a (shaded) wavefront error contour map and corresponding profile, respectively, generated in accordance with experimental data.
Figure 5B:
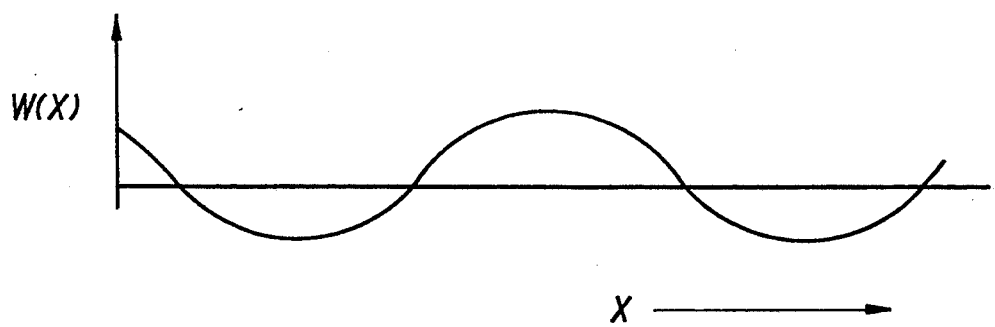

In order to test the LWPA concept, a wave front affected with 1/10 wave (peak-to-valley) of spherical aberration was evaluated. The data consisted of a single strip through the wavefront error map which comprised approximately 10% of the full aperture. A contour (shaded) wavefront error map is presented in FIGS. 5A, B. The wavefront error contour map is shown in FIG. 5A, and the corresponding profile in FIG. 5B.

The local performance contribution for the example aberration (pure Zernike spherical) is well known and thus allows assessment of LWPA accuracy. A strip format was selected for ease of presentation, but the results are directly extendable to the complete pupil.

Figure 6:
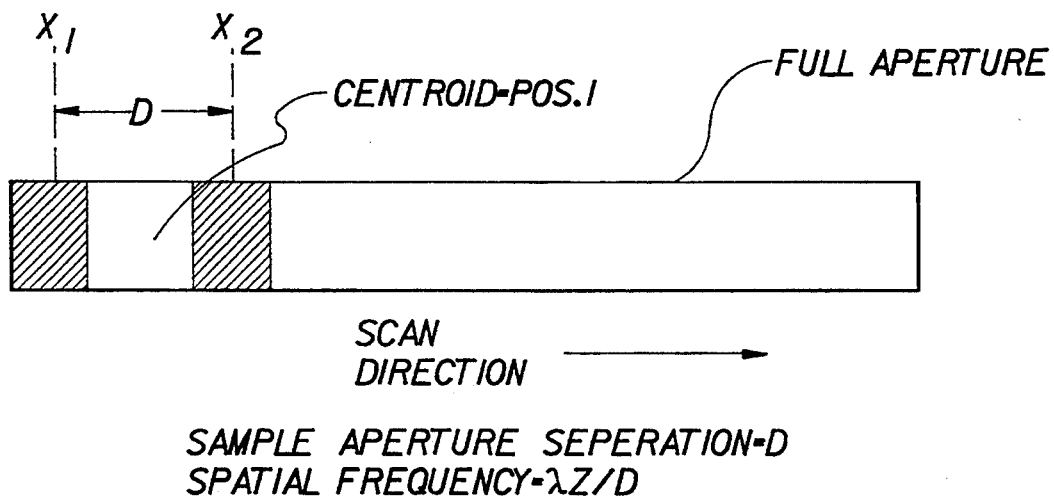
FIG. 6 shows a schematic of an illustrative LWPA sampling geometry.
Figure 7:
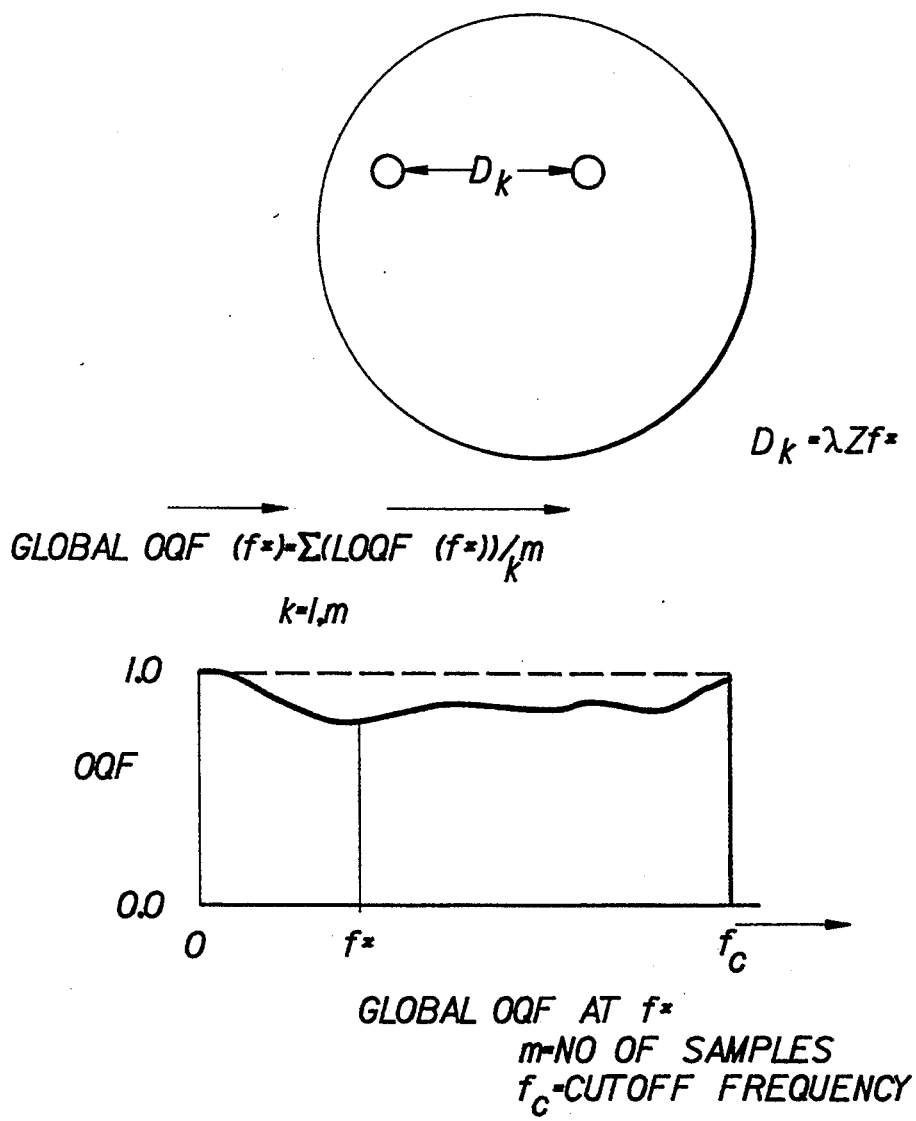
FIG. 7 shows a schematic to explain a nexus between local to global performance estimation.

The corresponding LWPA sampling geometry is schematically shown in FIG. 6.

Specific sampling parameters are as follows:

1) Rectangular sample area (both apertures): about 10% of input aperture area.
2) Sample aperture separation distance D is about 14% of input aperture width—commensurate with 10 c/mm information.
3) Filter shift distance (sample spacing every 4 data points)—about 8% of input aperture diameter.

This sampling geometry describes the error mensuration/correction capability of the exemplary LWPA. The sampling aperture area is characteristic of the spatial resolution inherent in the measurement/correction process. The measurement and correction is assumed accurate to within the error circumscribed within the LWPA sampling apertures. Subsequent correction of those errors will also entail these regions. Thus the granularity of the correction is delimited by the finite area of the sampling apertures.

In the limit of pinhole sampling apertures, the minimum samples entail single error in each aperture. In this case, the LOQF→1.00 and the LWPA performance reduces the assessment of the value of the LPTF part of the complex LOQF performance parameter. This maximal resolution case corresponds with the Reference 1 paper where the difference-RMS is used for rapid computation of the MTF and the setting of imaging performance based specifications.

The above parameters resulted in a LWPA consisting of 13 uniformly spaced samples that spanned the pupil region. Since each sample consisted of two dilute sample apertures, the total data base comprised 26 local regions. The performance map of Table I gives test-case results in terms of OQF versus aperture position.

TABLE I

| | Performance Map (10 c/mm) | | |
|---|---|---|---|
| POS | LMTF(10) | LPTF(10) | LOOF(10) |
| 1 | 0.4883 | +15.5 | 0.9766 |
| 2 | 0.4959 | −4.8 | 0.9918 |
| 3 | 0.4992 | −15.4 | 0.9984 |
| 4 | 0.5000 | −18.3 | 1.000 |
| 5 | 0.4995 | −15.4 | 0.9990 |
| 6 | 0.4988 | −8.7 | 0.9976 |
| 7 | 0.4985 | 0.0 | 0.9970 |
| 8 | 0.4988 | +8.7 | 0.9976 |
| 9 | 0.4995 | +15.5 | 0.9990 |
| 10 | 0.5000 | +18.3 | 1.000 |
| 11 | 0.4992 | +15.4 | 0.9984 |
| 12 | 0.4959 | +4.8 | 0.9918 |
| 13 | 0.4883 | −15.5 | 0.9766 |

The Table I values are ordered in the form of a 10 c/mm imaging performance map (OQF). The results are shown at 13 equally spaced points over this aperture. Table I parameters include:

POS: the position of the local error in the aperture-position is along the X-direction; left-to-right with position 1 leftmost (see FIG. 6);

LMTF(10): local MTF at 10 c/mm;

LPTF(10): local phase error at 10 c/mm in degrees;

LOQF(10): local optical quality factor at 10 c/E-ratio of LMTF(10) to the corresponding diffraction limited LMTF.

This result shows that wavefront errors at positions 1 and 13 had the greatest impact on performance (lowest LOQF), while 4 and 10 had the least (highest LOQF). Since local positions 1 and 3 had the lowest LOQF values, they would be modified first with the expectation that their correction results in the maximal global OQF improvement at 10 c/mm. Simulated correction was accomplished for these maximally high loss positions in addition to those at 2 and 12 and 4 and 10. Correction of errors at 2 and 12 effected the second greatest improvement because they generated the second lowest LOQF, whereas correction at 4 and 10 did not contribute to improvement, in that their LOQF was already at a peak limiting value of 1.000 (i.e., the errors in the two regions are highly correlated).

Note that this is true given the exemplary granularity of the measurement/correction process. In a process with higher resolution, correction of errors in regions 4 and 10, by reduction of LPTF (4) and LPTF (12) to zero, will yield significant improvement in the global imaging quality at 10 c/mm.

After each correction, the global OQF was recomputed. Corrected results and calculated improvement ratios are shown in a Table II.

TABLE II

Results at Three Position Sets (10 c/mm) (Input MTF 0.8405)

| | Positions Corrected: | | |
|---|---|---|---|
| | 1 & 13 | 2 & 12 | 4 & 10 |
| MTF-after corr: | 0.8584 | 0.8429 | 0.8394 |
| Improve.Ratio: | 1.022 | 1.015 | 1.000 |

As seen, the LWPA dictated corrections in regions 1 & 13 gave the greatest improvement, 2 & 12 the next greatest improvement, and, 4 & 10 little or no improvement. These results are in complete agreement with the prioritization indicated by the Table I LWPA performance map. The maximal 2+% gained with the correction of errors in positions 1 and 13 may represent a significant improvement for 10 c/mm information transfer. On this basis, the example case has demonstrated a localized performance directed optimization for full aperture OQF.

(Note this is true for the granularity or spatial resolution of the mensuration/correction process considered in the example. In the mensuration/correction process with correction of higher spatial resolutions, requires 4 and 10 will yield significant improvement at 10 cycles/mm because of the relatively large LPTF value of 18°.)

It is important to assess the effect of the above LWPA dictated correction on other frequencies in order to determine impact on lens wideband performance. A qualitative assessment is presented in Table III.

TABLE III

| Filter Results vs. Frequency (10 c/mm) | | | |
|---|---|---|---|
| Frequency c/mm | D1MTF | D2MTF | %-IMP |
| 10 | 0.0318 | 0.0179 | 56.3 |
| 20 | 0.0563 | 0.0088 | 15.6 |
| 30 | 0.0548 | 0.0263 | 47.9 |

D1MTF: The difference between the diffraction limited MTF and the perturbed input MTF.

D2MTF: The difference between the corrected and input MTF.

%-IMP: The percent improvement calculated as the ratio D2MTF/D1MTF.

The table indicates the performance improvement for a band of spatial frequencies given LWPA dictated correction at positions 1 and 13, regions contributing maximal performance loss for 10 c/mm information transfer.

The 56.3% improvement in the 10 c/mm global OQF is as expected. The interesting aspect of the data concerns a non-uniform enhancement associated with the data at frequencies of 20 and 30 c/mm. The fact that 20 and 30 c/mm performance is also enhanced is expected, given the high spatial correlation associated with the input aberration function. However, the relative differential in the size of the improvements (47.9%-vs-15.6%) suggests that performance improvement at collateral frequencies will not be uniform. The non-randomness of arbitrary aberrations, particularly the highly deterministic form for the example test case, supports the differential shown in the Table III data.

Local to Global Performance Estimation

This section considers the connection between local and global performance in greater detail. It would be highly desirable to show that there is more than a correlation between local and global performance. The following results will show, that with appropriately spaced samples, the average vector sum (AVS) of the local complex OQF values gives a good approximation to the global result. This concept is shown schematically in a FIG. 7.

Note that the global OQF is the average vector sum (AVS) of the local OQF values; arrow denotes vector in diagram. This formula ties the full aperture performance, denoted the global OQF, to the local OQF values represented by the m OQF(f*)'s under the summation symbol. In this model, the OQF is a complex number (treated in vector form) which is comprised of modulus and phase parts that are indicative of performance. Thus, the global OQF at a given spatial frequency is the phasor or vector average of the m local OQF values. A mathematical derivation of this result is given infra in "Average Vector Sum Derivation". Table IV presents the AVS calculation data for the Table II performance map.

TABLE IV
LWPA VECTOR SUM ESTIMATE OF GLOBAL OQF

| POS. | LPTF(10) | LOOF(10) | C(PTF) | S(PTF) | LOOF × C(PTF) |
|---|---|---|---|---|---|
| 1 | +15.5 | 0.9766 | 0.9636 | 0.2672 | 0.9413 |
| 2 | −4.8 | 0.9918 | 0.9965 | −0.0837 | 0.9883 |
| 3 | −15.4 | 0.9984 | 0.9641 | −0.2656 | 0.9626 |
| 4 | −18.3 | 1.000 | 0.9494 | −0.314 | 0.9494 |
| 5 | −15.4 | 0.9990 | 0.9641 | −0.2656 | 0.9631 |
| 6 | −8.7 | 0.9976 | 0.9885 | −0.1513 | 0.9861 |
| 7 | 0.0 | 0.9970 | 1.0000 | 0.0000 | 0.9970 |
| 8 | +8.7 | 0.9976 | 0.9885 | 0.1513 | 0.9861 |
| 9 | +15.5 | 0.9990 | 0.9641 | 0.2656 | 0.9631 |
| 10 | +18.3 | 1.000 | 0.9494 | 0.3140 | 0.9494 |
| 11 | +15.4 | 0.9984 | 0.9641 | 0.2656 | 0.9626 |
| 12 | +4.8 | 0.9918 | 0.9965 | 0.0837 | 0.9883 |
| 13 | −15.5 | 0.9766 | 0.9636 | −0.2672 | 0.9413 |
| | | | | Vector Sum: | 12.5786 |

Table IV entries present the vector summation components for each position in the aperture with the following nomenclature:

POS: aperture position;
LPTF(10): local phase error at 10 c/mm in degrees;
LOQF(10): local optical quality factor at 10 c/mm-ratio for MTF(10) to its corresponding diffraction limited MTF;
C(PTF)=Cosine of PTF, local cosine vector component;
S(PTF)=Sine of PTF, local sine vector component;
LOQF × C(PTF)=the product of the local OQF and the cosine of the PTF.

This represents the cosine component contribution of the local region to the global OQF.

The C(PTF) and the S(PTF) are the vector cosine and sine components (real and imaginary axis projections) associated with the local OQF's. According to the math model shown in FIG. 4 and derived in Appendix B, the AVS of the OQF's is a good estimator of the corresponding global result. An algebraic summation of the sine and cosine components of the LOQF gives corresponding global components. The global OQF is then computed at the Root-Sum-Square (RSS) of the two sums. Note that since the tabular results are for an optic with spherical aberration, a symmetrical or even function, the S(PTF) factors sum to zero and it is not necessary to compute OQF X S(PTF). However, the OQF X C(PTF) summation total is 12.5786 and the estimated global OQF is calculated directly as 12.5786/13 or 0.9676. This compares with a conventional global result of 0.9635 as computed from the autocorrelation of the full aperture complex pupil function—well within our computational accuracy.

The above example highlights the strength of the localized approach in maximizing the rate of convergence to acceptable performance. We note that the performance map of Table I is a satisfactory indicator of the performance contribution from local pupil regions in that results are in agreement with the local wavefront error contributions expected from the test case deterministic aberration. For example, the maximum error slope differential for the input spherical aberration is located in the regions associated with positions 1 and 13 for 10 c/mm information transfer—maximal loss would be expected in these regions. For example, the maximal slope error correlates with the maximum transverse ray error at the image plane.

A good counter-example is afforded by the minimal loss indicated for errors at positions 4 and 10 (LOQF of 1.0). This result is mathematically supported by the fact that the second derivative of the wavefront error for 10 c/mm information, as characterized by the differential of the LPTF(10) function, is approximately zero at these positions. The presence of an inflection point suggests that error modification will be relatively ineffective as a means of increasing imaging performance at the evaluation frequency, because of the approximately linear (highly correlated) nature of the wavefront errors which include these regions. In essence, the granularity of the correction process creates errors in adjacent regions that nullify the correction of errors at positions 4 or 10.

II. The Method Of The Present Invention In Terms Of A Controlled Feedback Capability The first aspect of the present invention, namely, its capability for providing a localized imaging quality assessment of an imaging device, has now been disclosed, and we accordingly turn our attention to particulars of the second aspect of the present invention. Here, as summarized above, we desire to exploit the first aspect's assessment capabilities, to an end of generating correction feedback, developed from this assessment, for first applying a controlled feedback action to a monolithic imaging device, and secondly, applying such a feedback action to a non-monolithic imaging assembly A. A Monolithic Imaging Device In general, a "controlled action" to the monolithic imaging device may be realized in accordance with a generic FIG. 8 construct, wherein:

Numeral 24=input optic (input wavefront conditioning such as autocollimation, null compensation, etc.;

26=imaging device or optic undergoing LWPA evaluation;

28=LWPA filter, shown as a spatial light modulator (SLM);

30=LWPA signal detector, read-out and evaluation;

32=computed performance map-LOQF vs pupil position-x;

34=global OQF, computed for full pupil;

36=correction feedback or controlled action;

and where $D_{max}$ is the maximum extent of the pupil, and $f_{max}$ is a test optic cut-off frequency.

The FIG. 8 construct is generic, since it comprises a feedback correction capability for an operational adaptive optical system, or a low volume manufacturing control system, or a high volume manufacturing control system. Particulars on all three systems are disclosed, below.

For all three cases, the LWPA system can generate a performance map, directly, with hardware (such as the noted SLM), or by computation from the recorded wavefront errors. This gives LOQF vs pupil position for spatial frequency f*, as shown at FIG. 8 inset 38. Those regions with the lowest LOQF are the worst imaging degraders, shown at pupil position X* of this figure inset. Verification may be seen in the conventional global OQF, at FIG. 8 inset 40. As indicated, the greatest global improvement can indeed be effected for frequency f*, via correction of the pupil error at position X*:

Correction information may be obtained from the LPTF part of the complex LOQF, which indicates the differential error between the two regions of the wavefront error circumscribed by the sampling apertures. When the bias (piston) error between the two sampling aperture error regions is nulled, the LPTF part of the complex LOQF is zero.

1. Particulars on LWPA Application To Adaptive Optica

Figure 9:
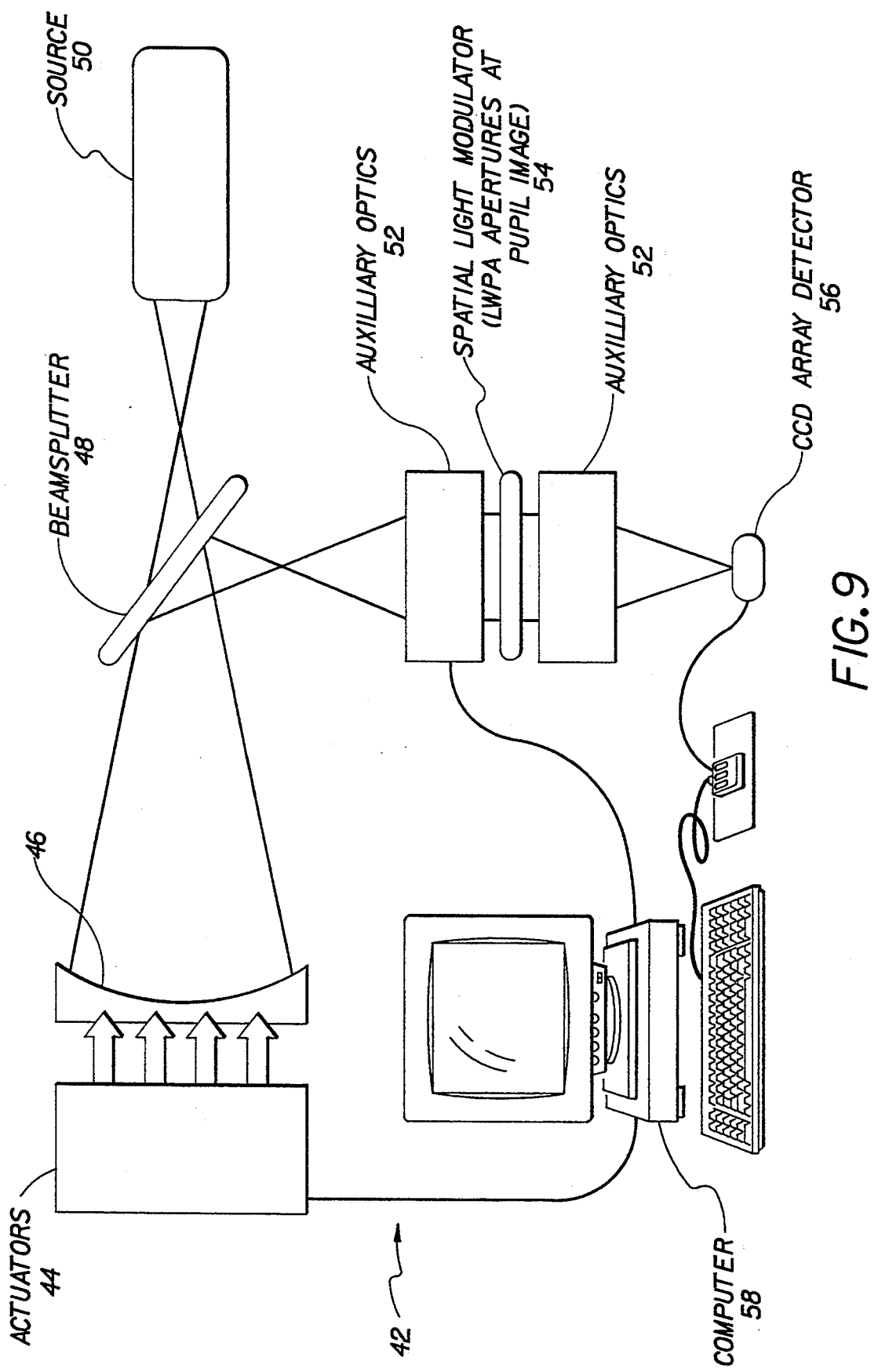
FIG. 9 shows a first species of the FIG. 8 generic correction feedback assembly comprising an active control system.

Attention is now directed to FIG. 9, which shows a first species of the FIG. 8 generic correction feedback construct, comprising an active control system 42. In particular, the active control system 42 includes conventional components connected as shown:
  force or displacement actuators 44;
  test optic 46;
  beamsplitter 48;
  light source 50;
  auxiliary optics 52;
  spatial light monitor 54;
  CCD array 56; and
  computer 58.

With respect to the FIG. 9 active control system 48, note that the image quality of the test optic 42 can be directly improved on the basis of local performance assessment. For example, the number of force and/or displacement actuators 44 can, via the method of the present invention, be optimally determined, and optimally positioned, within the active pupil element. This leads to greater efficiency in a correction process, since it derives from local, rather than global, performance parameters.

Note, furthermore, that in operation, the force actuators 44 can apply a required or determined force to the test optic 46 via the LOQF performance map (Table I), as calculated by the computer 58. To this end, the computer 58 may be conventionally programmed to develop, in accordance with input parameters from the performance map, an influence function, of the type disclosed, for example, in U.S. Pat. Nos. 4,875,765 and 4,993,823, and incorporated by reference herein.

Figure 10:
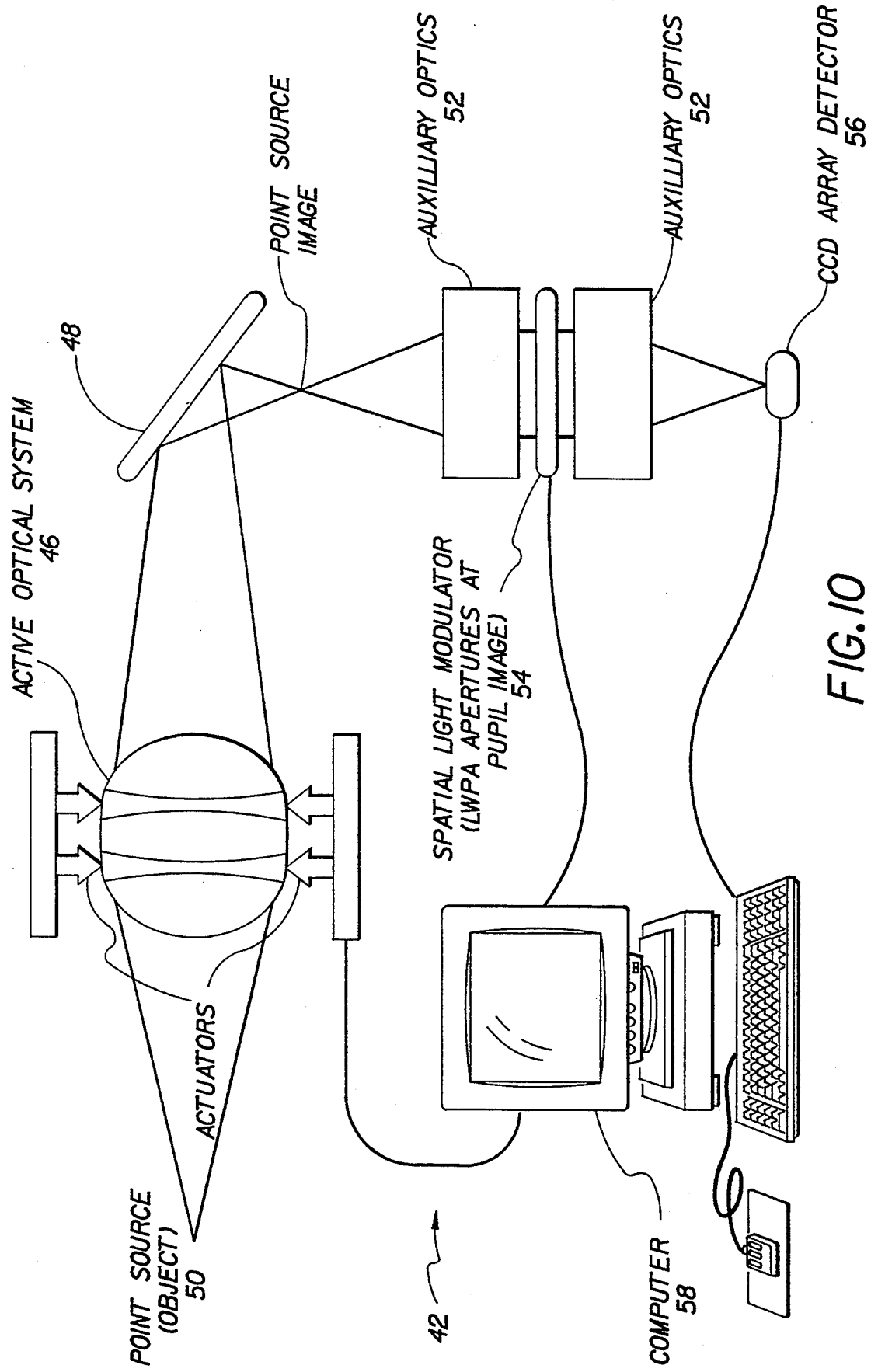
FIG. 10 shows a second species of the FIG. 9 correction feedback assembly comprising an active control system in operative configuration.

Attention is now directed to FIG. 10, which shows a second species of the FIG. 9 active control system 42. Here, the components are the same as those listed for the FIG. 9 system 42, but they are now slightly re-structured so that the method of the present invention can be used in a wavefront sensor configuration.

In the FIG. 10 operation, the pupil is imaged by the auxiliary optics 52 onto the spatial light modulator 54. The light is re-imaged onto the CCD detector 56, which is conjugate to the original image surface. The signal from the detector is Fourier transformed to give the LMTF, from which the LOQF is calculated. The spatial light modulator 54 may be programmed to step through a series of pupil position locations by scanning the sample apertures over the imaged pupil, as schematically shown in FIG. 4. This results in a performance map of LOQF versus pupil position, which the computer 58 uses to determine the local corrections necessary to maintain acceptable imaging quality. This is done using a conventional optimization algorithm. The system can then evaluate the effects of the changes in real-time to insure that the image quality is maintained.

Note that the LWPA method can also be used to tailor the response of an adaptive system to user needs. For example, if it is required that the system performance be optimized at specific frequencies (typical of most performance specifications), LWPA can be used to determine those local features which will give the most efficient convergence to acceptable imaging quality for such frequencies in terms of the OTF. (In contrast, conventional methodology involves minimizing the RMS of the wavefront error - a function which is frequency transparent.)

LWPA and Manufacturing Control Introduction

Figure 11:
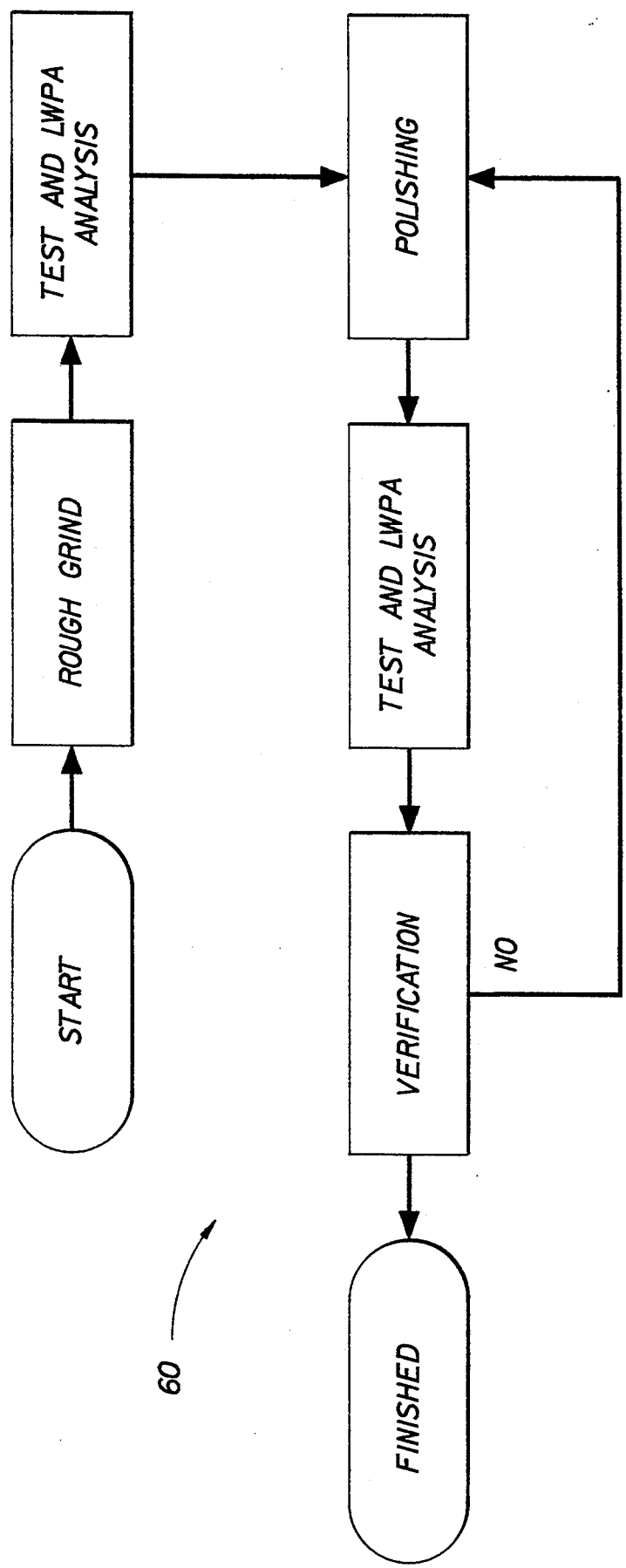
FIG. 11 comprises a low volume manufacturing control flowchart utilizing a method of the present invention.

High volume process control involves an entire manufacturing process (see FIG. 14), which entails a rapid sequential production of optical components and systems. In this process, individual components and systems are not reworked until they meet specification. This is in contrast to low volume production (see FIG. 11) where components and systems are processed until they meet specification.

2. Particulars On LWPA And Low Volume Manufacturing Control

In the same way that LWPA can be used to determine localized optical performance and prioritize a correction sequence for an active system, it can be used in the manufacturing of optical components. In this case, the corrections may be provided by polishing or figuring tools that can reduce "high spots" on an optical surface. (Currently, in contrast, an optical component is typically polished until it reaches a specified RMS wavefront error.)

LWPA provides the basis for an intelligent manufacturing system dedicated to the production of optical components. The result is a method 60 (see FIG. 11) where raw materials are input and finished products are output. In essence, this removes the art from the fabrication of optical components, and leads to an improved competitiveness in today's markets.

An automated procedure typically starts with a set of LWPA compatible requirements on the components to be manufactured. The raw materials (optical blanks) may be input into the process where they may be first rough ground to an appropriate figure. Once the figure is ground, the component may be tested, and performance maps may be generated, using LWPA at specific frequencies. Each of the frequency based performance maps may be properly weighted and summed, to give a composite map that may be used to correct those local regions which yield the greatest improvement in imaging quality.

FIG. 12 shows the potentially large differences between performance and wavefront error. In this example, the performance map shows that the errors in the pupil center are not significant with respect to the imaging performance at the spatial frequency, f*. In contrast, the wavefront error map dictates a need for correction in this region. If the optic were processed according to this criteria, resources would be wasted.

Figure 13:
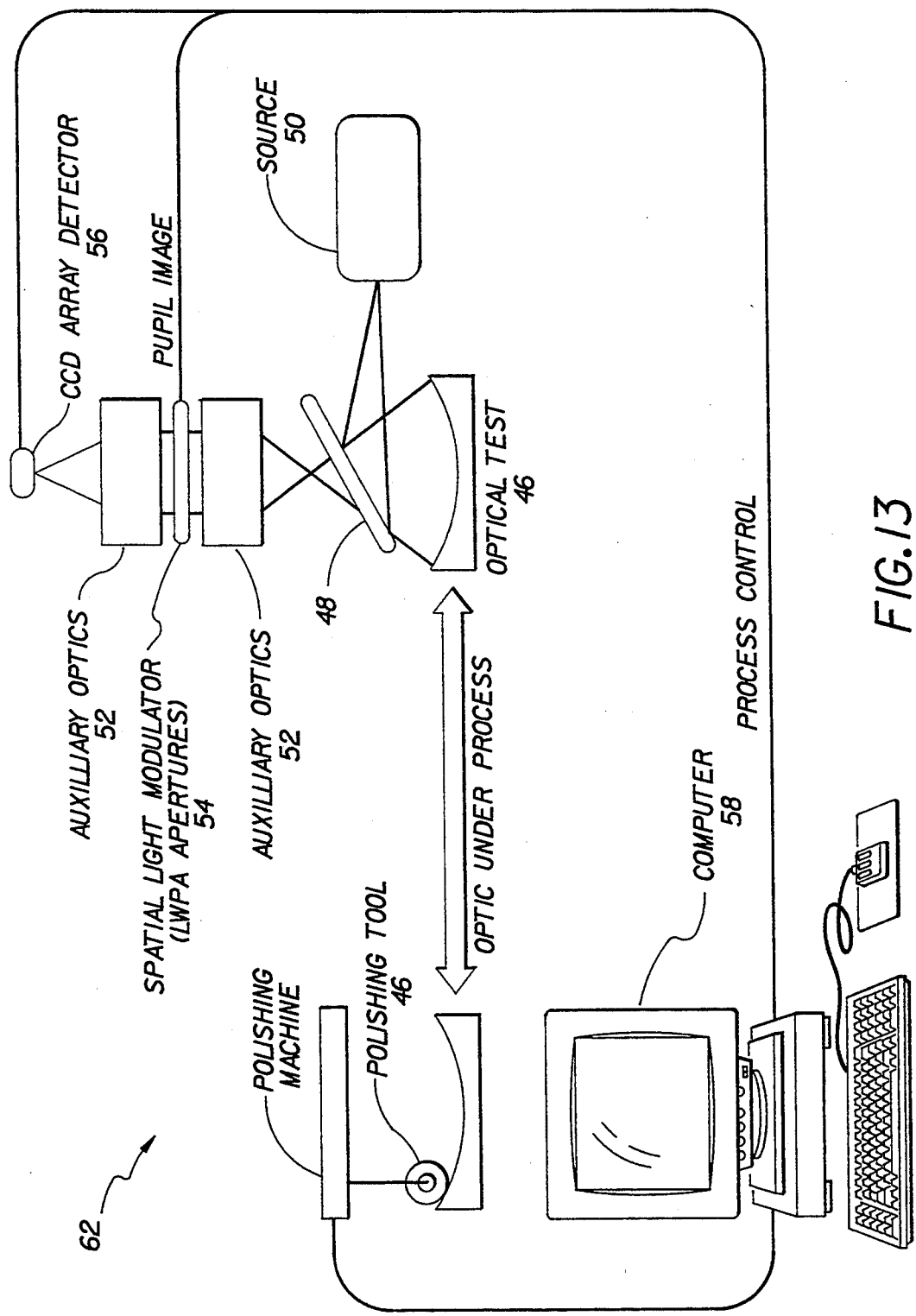
FIG. 13 shows a hardware realization of the FIG. 11 flowchart.

FIG. 13 provides an example of a polishing process 62 using LWPA. An optical component may be polished based on inputs from the process control computer. It may be then tested and the results evaluated using LWPA. The process control computer uses the lowest LOQF values to determine the local areas where correction will give the largest improvement in performance. The component may be returned to testing, where another wavefront error map may be generated, and a LWPA analysis performed.

In theory, if the testing were sufficiently accurate, the component would be completed with one processing cycle. Uncertainties and errors in the testing procedure may preclude this possibility; however, even with testing errors, the number of cycles will be reduced.

In summary, the success of this procedure depends on the ability of LWPA to correct only those features which may affect user imaging performance requirements. This results in a system which is tailored to the customers performance requirements, in that the optics bandpass has been optimized. Because of the normally high correlation in the manufacturing process, collateral (non-specification) frequencies will in general improve, but not at the same rate as the prioritized critical one(s).

3. Particulars On LWPA And High Volume Manufacturing Control

Figure 14:
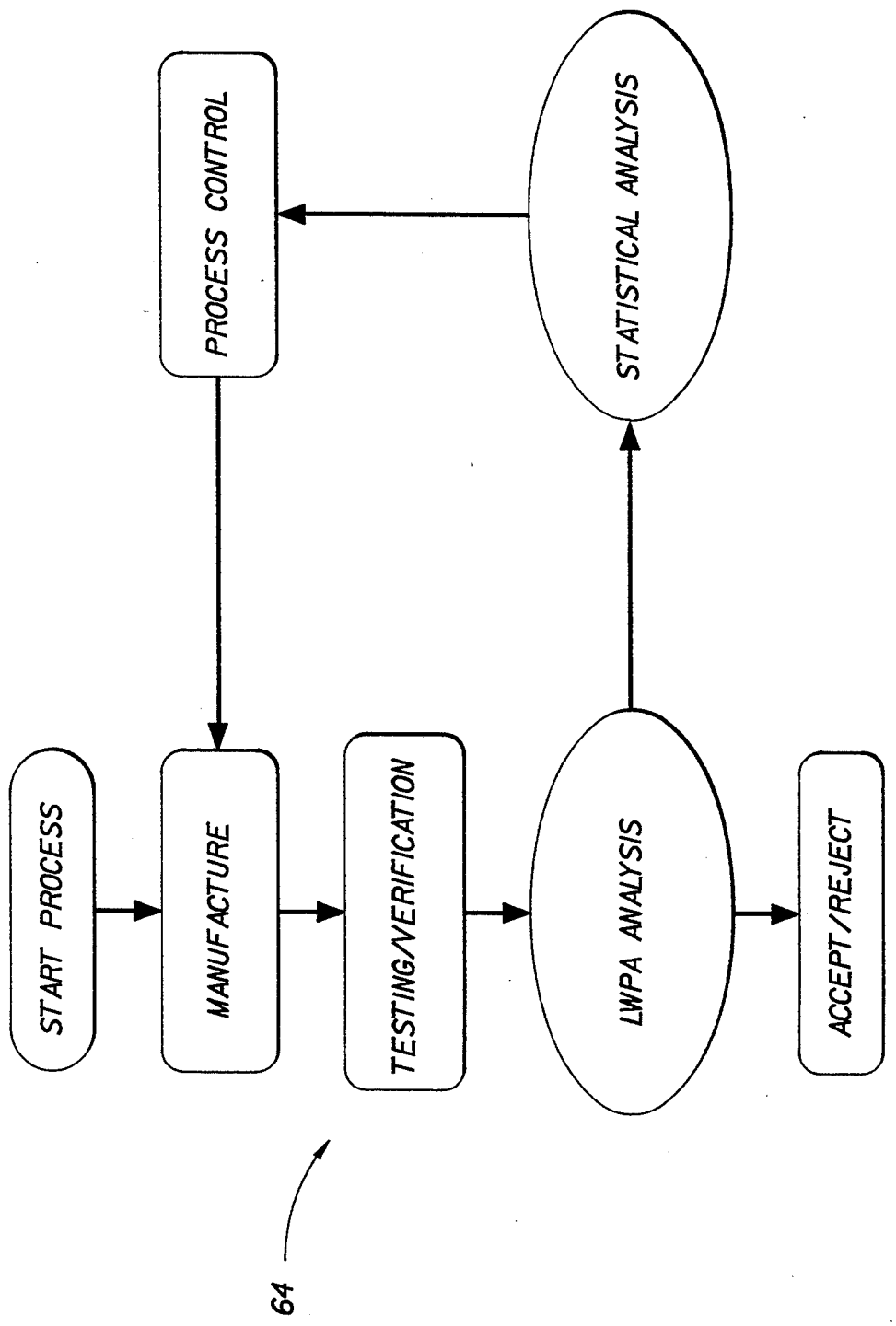
FIG. 14 comprises a high volume manufacturing control flowchart utilizing a method of the present invention.

The LWPA system can also monitor and control the high volume manufacture of precision optical components and systems, and is shown schematically in a FIG. 14 high volume process control flowchart 64.

Figure 15:
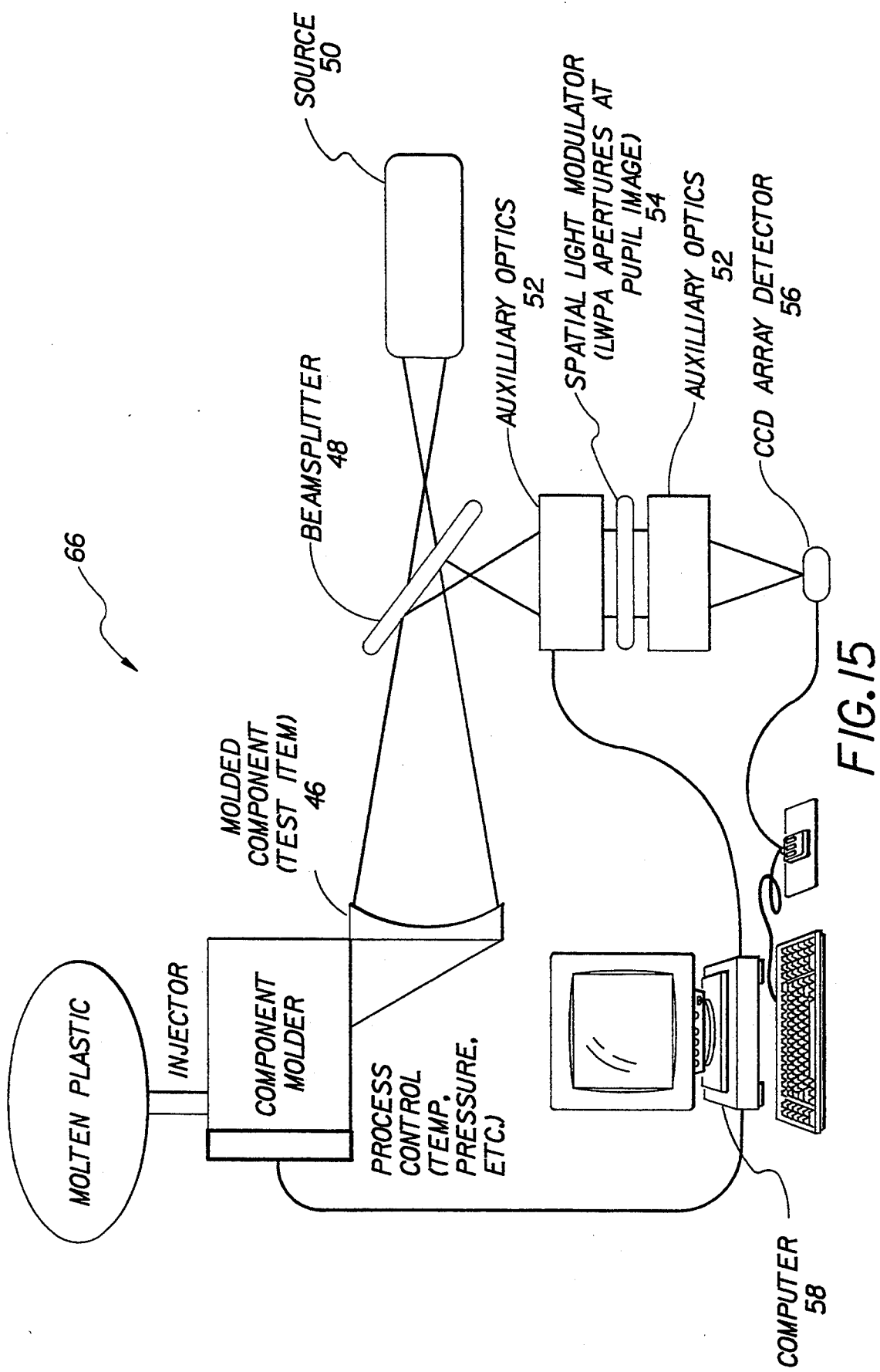
FIG. 15 shows a hardware realization of the FIG. 14 flowchart.

FIG. 15 shows an example of the FIG. 14 flowchart process, using a standard high volume manufacturing process 66 such as injection molding. As the components and/or systems are manufactured, they may be tested and evaluated at specific frequencies using LWPA. The results may be combined to form performance maps as shown in FIG. 16.

If the component or system meets specifications, per global OQF, as calculated using the average vector sum (AVS), and cumulative probability distribution function (CPDF) of the LOQF's, it is accepted.

B. A Non-Monolithic Imaging Assembly we have shown that LWPA involves a direct sampling of the lens pupil. Each sample can provide a degree of performance degradation at its position in the pupil.

The effectiveness of this process is independent of full aperture geometries. For example, in the case of segmented or even dilute aperture systems, the pairwise and separated LWPA sampling subapertures can readily assess the performance at pupil positions that range over one or more independent subpupils. FIG. 17 presents this concept.

As shown in FIG. 17, a sample may straddle the discontinuities of a synthetic (FIG. 17A) or segmented (FIG. 17B) aperture, and can thus supply correction information involving two system subpupils. LWPA can therefore be used to assess the effect of segmenting/dilution on imaging quality via inter to intra subpupil quality comparisons, thereby quantifying the benefits for preferential positioning of pupil elements.

There are two more LWPA advantages in applications involving lens systems comprised of independent subpupils, namely:

1. assessment of subpupil performance;
2. prediction of full-pupil performance on the basis of incomplete subpupil testing.

These advantages are now developed.

Assessment of Subpupil Performance

LWPA samples of subpupil quality, in principle, can involve the contribution to imaging quality for spatial frequencies up to and including those proportional to its maximal dimension. This concept is shown in FIG. 18.

Figure 18:
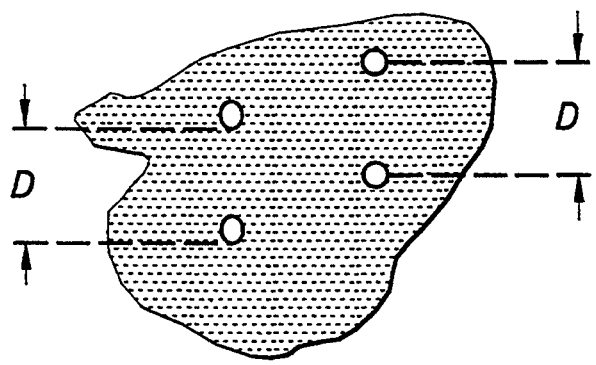
FIG. 18 shows intra-subpupil localized wavefront sampling.

A generalized subpupil is shown in FIG. 18, with LWPA samples at spacing D. Since the spatial frequency of the LWPA is proportional to distance, the maximal size of the subpupil limits the highest frequency LOQF assessment. In the case shown, the assessment spatial frequency, fd equals $D/\lambda z$ ($\lambda$ is wavelength and z is lens focal length). If the system specification is such that two specification frequencies are proportional to D/2 and D, full-pupil performance prediction for both can be obtained from this initial subpupil test. Of course, there would be more statistical confidence in the lower frequency assessment, because there are more D/2 samples (assuming a uniform sampling interval) within the pupil.

Figure 19:
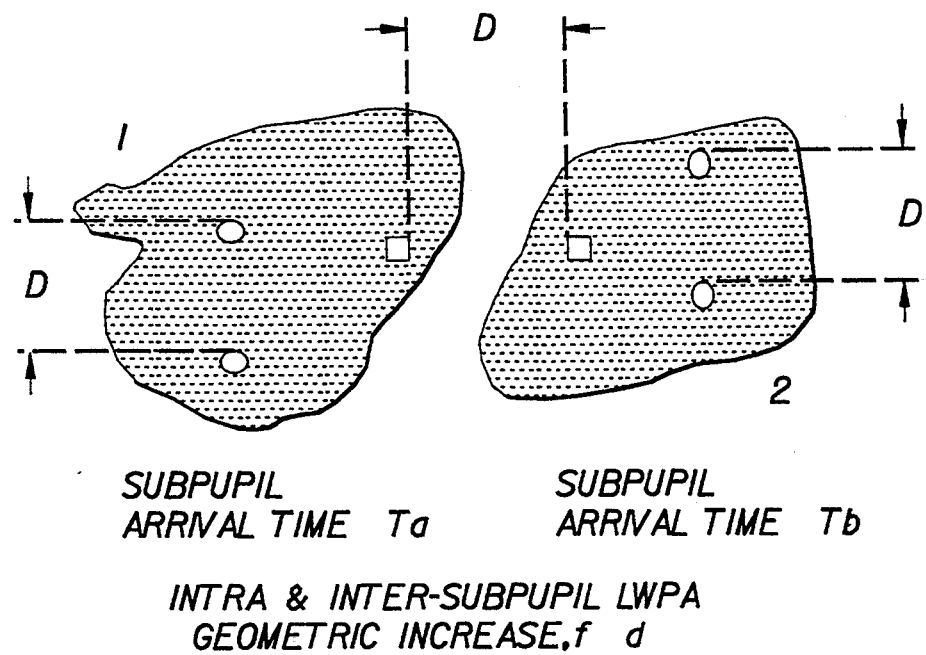
FIG. 19 shows intra and inter subpupil localized wavefront sampling.

FIG. 19 presents a schematic indication of the expansion of assessment frequencies when more than one subpupil has been tested.

Figure 20:
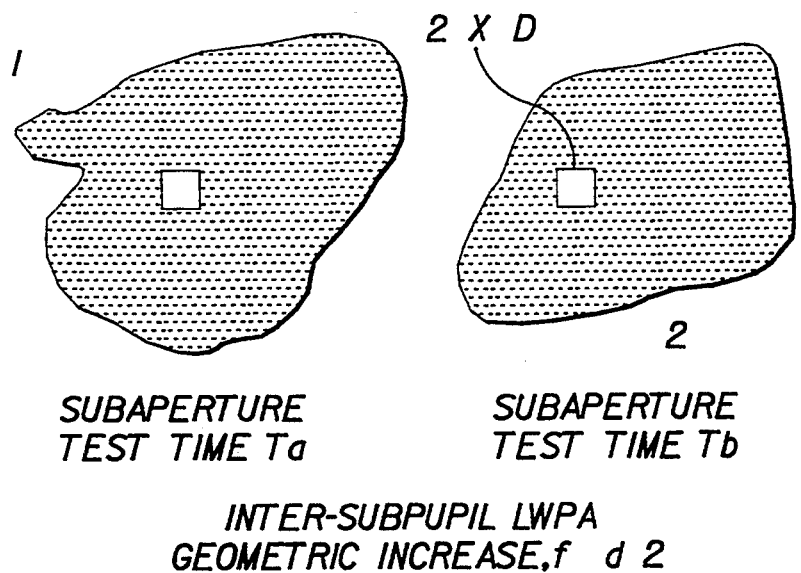
FIG. 20 shows inter subpupil localized wavefront sampling.

At this point, intra (shown illustratively as round apertures) and inter (shown illustratively as square apertures) samples are also available, which results in a geometric increase in the number of available LOQF assessments at frequency fd. FIG. 20 portrays a second benefit available when more than one subpupil has reached the testing phase of product development.

As indicated, LWPA evaluation of the two subpupils also extends and increases the maximal LOQF assessment frequency. As shown in FIG. 20, sample apertures with a 2D separation are now possible. Thus, at this point we have information on performance for two separate subpupils and one major subpupil (comprised of the same two subpupils) for LOQF at frequencies fd/2, fd and f2d.

Categorizations of inter and intra subpupil performance allow comparisons heretofore not possible. For example, an engineer can assess the differential quality relative to two or more disjoint subpupils by keeping intra and inter results separate. These results can be valuable with regard to preferential subpupil positioning for image quality maximization.

The following section considers statistical and mathematical models that can be used to predict full-pupil performance, and the specification and acceptance of the subpupil contribution to imaging quality.

Performance Prediction

LWPA subpupil evaluations can be used to develop early-on prediction of full-pupil performance. Indeed, such predictions can be made as soon as LWPA samples have been obtained for the first subpupil entering the optical test cycle. In order to use such assessments for full-pupil performance prediction, it must be assumed that the LOQF subpupil error distributions are homogeneous (have approximately identical statistics). In the example case, the full-pupil performance prediction could commence at a time Ta, the time at which the first subpupil is available for test (FIG. 19). As the number of subpupils available for testing increases, the confidence in the predictions correspondingly increase. As described earlier, the highest assessment frequency also increases as more subpupils are tested. The following sections discuss two methods of imaging quality assessment.

Direct Performance Assessment

The reference document discussed an estimator of full-pupil performance, and denoted the average vector sum (AVS) which gives the full-pupil OQF as:

$$OQF(fd) = \frac{1}{N} \sum_{k=1}^{N} LOQF_k(fd).$$

This equation may also be used to compute the OQF on the basis of partially complete sub-pupil testing. For example, if a system is comprised of six subpupils, and only one has gone through the test process, a full-pupil prediction may be made with this formula on the basis of $n < N/6$ intra-subpupil samples. If the production process yields aperture elements with homogeneous errors, the AVS model can be used as an estimate of the full pupil average OQF(fd).

A lower bound of the OQF may also be computed if the variance associated with individual LOQF values are estimable. Since the LOQFs are complex, the uncertainties in magnitude and phase parameters can be factored into the AVS, to develop a composite variance for the summation that will be some inverse function of the sample size.

Figure 21:
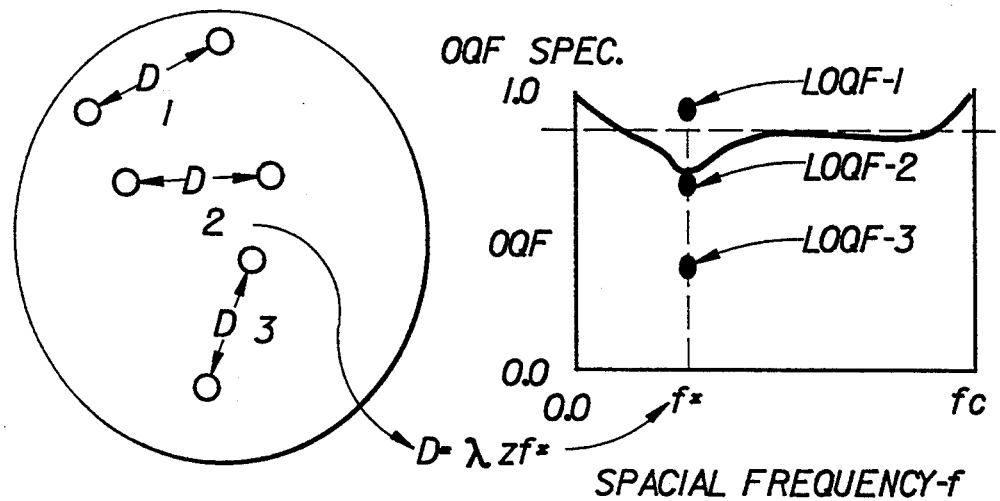
FIG. 21 shows a local optical quality factor sample estimate of optical quality factor.

FIG. 21 shows a hypothetical LWPA evaluation of an optic designed to highlight the effect of the separate LOQF components which comprise the above AVS estimate.

FIG. 21 shows how LWPA can pinpoint those local regions of the pupil which are predominantly responsible for failure to meet the OQF requirement. In the FIG. 21 example, the LOQF sample at region 2 is the most significant contributor to OQF loss at spatial frequency f*. Of the remaining samples, 3 is moderately inferior, and 1 is relatively superior to the specification OQf (indicated by the horizontal dashed line). An efficient correction sequence would begin with position 2, by far the worst degrader. Note that correction of the errors at this single position may result in meeting the full-pupil OQF requirement at frequency f*.

The following approach extends the most popular method of specification at the preliminary design stage, the random error wavefront assumption, to arbitrary error forms using LWPA.

Random Error Equivalent LWPA

During the preliminary design phase, there is usually little a priori information with regard to the form of aberrations expected during a production process. Because of these uncertainties, the assumption of random wavefront aberrations is almost always assumed. This assumption has the advantage of some (unknown) degree of conservatism on average, and is relatively simple to apply for tolerancing and trade-off studies. It also supplies a simple connection between the OQF and the random wavefront error via the well known Hufnagel function:

$$OQF = e^{-4\Pi^2 w^2_{rms}}$$

where $wrm_s$ is the wavefront error root-mean-square (RMS) value.

The derivative requirement for subpupil wavefront error RMS can be solved directly from the above as:

$$W_{rms} = \left[ \frac{-1}{4\Pi^2} Ln [OQF] \right]^{\frac{1}{2}},$$

the maximum allowed subpupil wavefront error RMS for compliance with the OQF requirement.

Although the Hufnagel model is a starting point (often the only one) at the preliminary design stage, it is a relatively poor model for subsequent application. In particular, real wavefront errors are not usually random, and thus negate the Hufnagel model. For example, a reduction in the RMS of a test wavefront due to the correction of local errors may lead to a concomitant decrease in imaging performance for some specification frequencies.

Ideally, it would be highly desirable to retain the Hufnagel assumption because of its aforementioned advantages, yet generalize its application to the product development and test stages. The issue at this point is how to best transfer from the preliminary Hufnagel based specification, to later stages in the product cycle where non-random errors are the rule.

Since the LWPA system is more independent of wavefront error form, we consider an approach where the distribution of LOQF magnitudes in the pupil is used as the criterion for lens acceptance. The following section details a preliminary design LWPA based specification that is analogous to, but more general in application, than the basic Hufnagel model.

Random Error Equivalent LWPA

Figure 22:
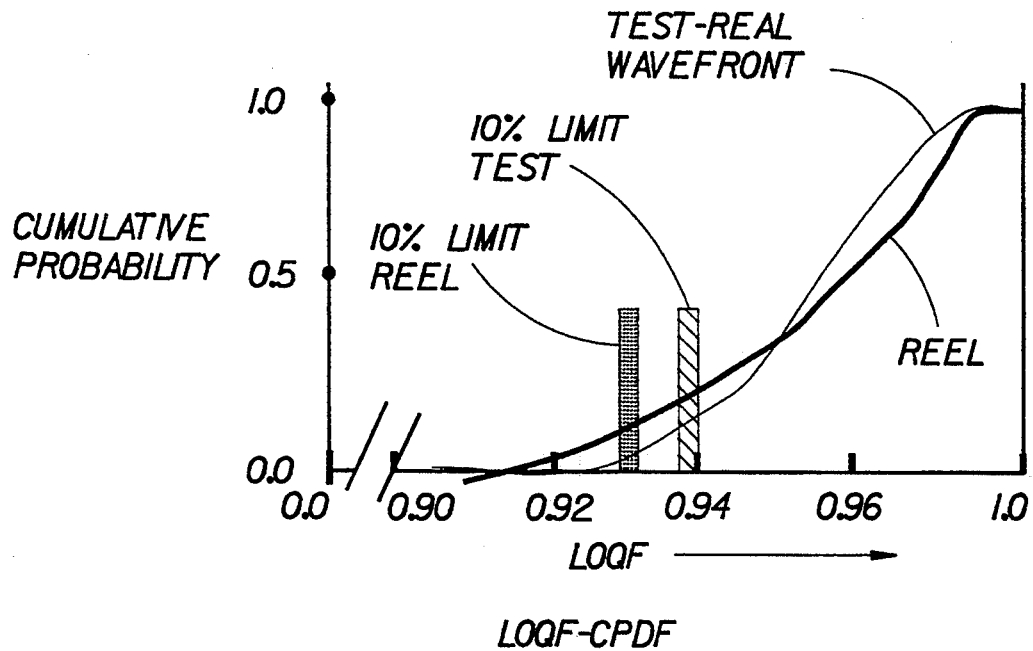
FIG. 22 shows a cumulative probability distribution function of a localized optical quality factor.

The OQF derivative Wrms requirement can be used to estimate or predict the LOQF distribution for random wavefront error using monte carlo techniques. A number of monte carlo generated wavefronts affected with the requirement rms error can then be evaluated with LWPA. A cumulative probability distribution function (CPDF) of the resulting LOQFs can now be developed, as shown in FIG. 22.

The random error equivalent LWPA (REEL-CPDF), the "thick" line of figure, may be based on the average of the monte carlo simulated wavefront errors. It incorporates the pre-design random error distribution assumption, in addition to the RMS requirement, into the specification process.

In order to obtain a single parameter acceptance criterion, a critical distribution statistic may be derived from the REEL-CPDF. For example, it may be proposed that its lower bound (say 10%), serve as the acceptance criterion for future subpupil test results. The test optic is deemed acceptable if its LOQF-CPDF is "superior" to that of the REEL-CPDF, per the 10% lower bound requirement. In the figure, the exemplified test $LMTF_{freq}$=Local Modulation Transfer Function at CPDF ("thin" line distribution) 10% lower bound on the test CPDF, occurs at a higher LOQF value (about 0.94) than the corresponding parameter for the specification REEL-CPDF (about 0.93), and therefore meets the performance criterion.

The total number of LOQF assessment frequencies required is a function of the product type, lens quality, and evaluation goal. In the case of a quality control check on a conventional (monolithic) system of moderate cost/quality, the OQF at a single spatial frequency may suffice. At the other extreme, in the case of multiple apertures for a high quality system, a relatively wide band of frequencies may be required. However, even in this case, only three sample frequencies may be necessary, because of the inter-correlation between the errors. Since the Nyquist frequency of image recording systems is approximately 50% of the lens cut-off frequency for well-matched systems, the largest critical assessment frequency is also well below the maximal frequency passed by the full-pupil lens system. In this case, the maximal assessment frequency may be proportional to 0.40P, where P is the largest active dimension of the full pupil. Thus, prediction of full-pupil performance at all specification frequencies may be available, when as few as two subpupils (of extent 0.40P) have reached the testing phase.

Conclusion

The LWPA system creates new evaluation opportunities with regard to the segmented/synthetic aperture optic, namely:

a) early prediction of full-pupil performance on the basis of results from one or more completed sub-pupil tests;

b) a generalization of the Hufnagel model to non-random wavefront errors (random error equivalent LWPA) thereby extending its use to the analysis and testing of optical hardware;

c) a means of maximizing full-pupil quality by determining an optimal positioning of segments/sub-pupil (relative to location in pupil}.

The reference paper used the average vector sum of the complex LOQF's in estimating full-pupil OQF. It is thus possible to use a "sampled38 wavefront as a means of lens evaluation if the sampling is appropriately dense (meets Nyquist criterion). This has the potential for minimizing the load on pre-detection or post-detection processors with regard to computation time/data storage requirements.

Example

Figure 23:
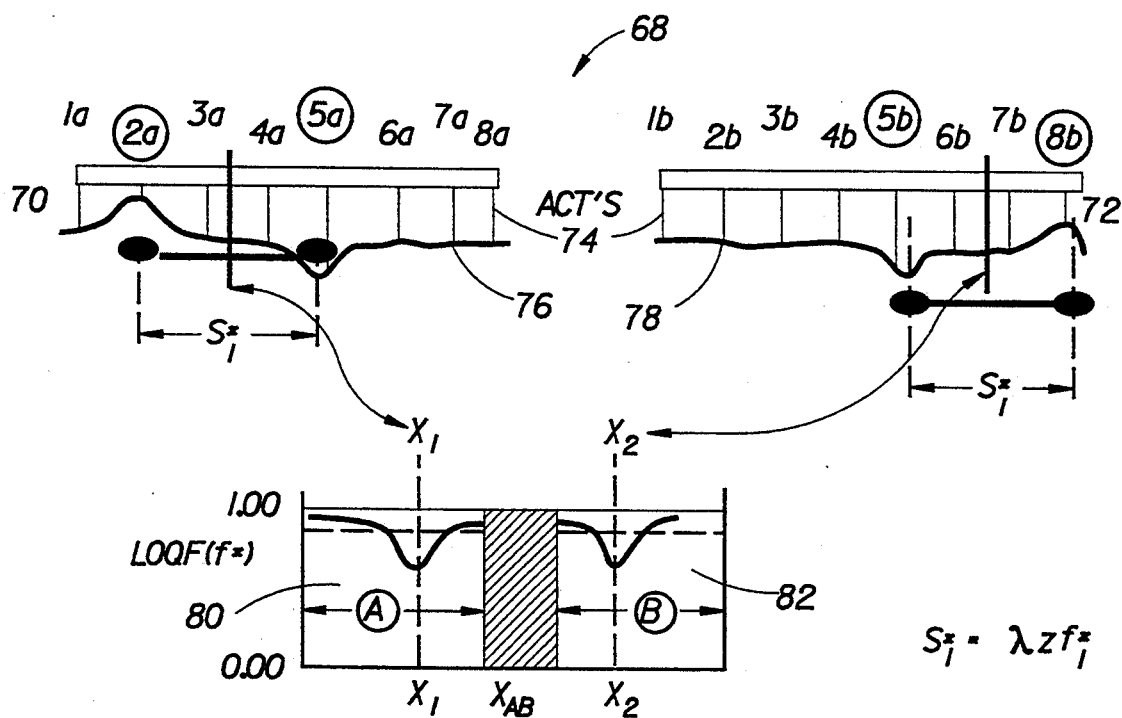
FIG. 23 shows an Example of correction feedback in an imaging assembly comprising two components.

Attention is now directed to FIG. 23, which shows an Example of the method of the present invention.

FIG. 23 shows an imaging assembly 68 comprising a first petal or segment 70, and a second petal or segment 72. The segments 70, 72 can cooperate to function as a continuous monolithic device. Juxtaposed to the segments 70, 72 are a plurality of conventional force actuators 74.

In accordance with the method of the present invention, one first assesses a wavefront error of the imaging component assembly 68, using LWPA. This action generates the wavefront error functions which are due to surface errors S(x) 76, 78, for each of the segments 70, 72, respectively.

Next, the method is used for generating from the wavefront error functions performance maps 80, 82, respectively, for each of the segments 70, 72.

Third, the performance maps 80, 82 provide correction feedback comprising inter-segment 70, 72, difference errors, for applying a controlled action (location and force) by a force actuator 74, to the segments 70, 72. In particular, note low (poor imaging quality) at pupil positions $X_1$ and $X_2$. Actuators denoted as $2a$ and $5a$ could correct the extreme error differences at position $X_1$ and $5b$ and $8b$ could correct the extreme error difference at position $X_2$ for subpupils 70 and 72 respectively.

Background references for the method of the present invention include:

1. D. S. Anderson and R. C. Crawford, "The MMT7 mirror: analysis of the rms difference specifications and their impact on fabrication and testing," SPIE Vol. 966 Advances in Fabrication and Metrology for Optics and Large optics (1988).
2. J. W. Goodman, "Introduction to Fourier Optics", McGraw-Hill Book Company (1968).
3. W. T. Rhodes and J. W. Goodman, "Interferometric technique for recording and restoring images degraded by unknown aberrations", JOSA, Vol. 63, No. 6y, PP. 647–657 (June 1973).
4. F. D. Russell and J. W. Goodman, "Nonredundant arrays and postdetection processing for aberration compensation in incoherent imaging", JOSA, Vol. 61, No. 2, pp. 182–191 (1971).
5. G. O. Reynolds, J. B. DeVelis, G. B. Parrent, B. J. Thompson, "The New Physical Optics Notebook", SPIE Optical Engineering Press (1989).
6. G. Indebetouw, K. Ray, T-C Poon, "Multiple-pupil interaction for parallel processing in a scanning optical system", Optics Communications, Vol. 79, No. 3,4, pp. 171–175 (1990).

The disclosures of each of these references are incorporated by reference herein.

AVERAGE VECTOR SUM DERIVATION

In this section we derive a mathematical relationship between the local end global or full aperture performance. The derived model will show that the global OQF can be expressed as the average of the vector (phaser) sum of the local C)QPs. In the following demonstration. it is assumed that the sampling density of the pupil plane satisfies the Nyquist criterion relative to the aberration spatial frequency bandwidth.

The OTF can be computed as the autocorrelation of the lens complex pupil function; P(x) as $$OTF(f) = \frac{1}{A} \int_S P(x)P^*(x+D)dx \quad (1)$$

Where

A = total area of full aperture
s = common region of integration for the product P(x) P(x+D)
P*(x+D) = complex conjugate of pupil function for shift distance λzf
λ = lightwavelength
z = distance of pupil to diffraction plane
D = pupil shift distance
f = spatial frequency $P(x) = p(x)e^{jkW(x)}$ and $P^*(x+D) = p(x+D)e^{-jkW(x+D)}$ where p(x) = complex transmittance of pupil
W(x) = tuberration function of pupil and $k = 2\pi/\lambda$ Thus, eq. (1) is expressed as $$OTF(f) = \frac{1}{A} \int_S p(x)p^*(x + D)e^{jk[W(x)-W(x+D)]}dx$$

For simplicity let $\Delta W(x,D) = [W(x) - W(x+D)]$, then $$OTF(f) = \frac{1}{A} \int_S p(x)p^*(x + D)e^{jk\Delta W(x,D)}dx \quad (2)$$

Euler's formula applied to eq. 2 gives $$OTF(f) = \frac{1}{A} \int_S p(x)p^*(x + D)[\cos(k\Delta W(x,D))]dx + \ldots +$$

$$\frac{j}{A} \int_S p(x)p^*(x + D)[\sin(k\Delta W(x,D))]dx$$

$OTF(f) = 1/A \; (a + Jb)$, where $$a = \int_S p(x)p^*(x + D)[\cos(k\Delta W(x,D))]dx$$

$$b = \int_S p(x)p^*(x + D)[\sin(k\Delta W(x,D))]dx$$

The polar form of the OTF is given in terms of the MTF and the PTF as $$OTF(f) = MTF(f)e^{jPTF(f)}$$

where $$MTF(f) = (a^2 + b^2)^{\frac{1}{2}}$$

and $$PTF(f) = \arctan\{b/a\}$$

Given that $\Delta W(x,D)$ is approximately linear over the LWPA sample aperture, then $$OTF(f) = \frac{1}{A} \; c\{p(x)p(x + D)\} + \frac{j}{A} \; s\{p(x)p(x + D)\} \quad (3)$$

where
c{ } = the Fourier cosine transform
s{ } = the Fourier sine transform

The modulus of the OTF is the MTF and is then expressible as $$MTF(f) = \frac{1}{A} [ ( \; c\{p(x)p(x + D)\})^2 + ( \; s\{p(x)p(x + D)\})^2 ]^{\frac{1}{2}}$$

and the corresponding OTF phase as $$PTF(f) = \arctan\left( \frac{( \; s\{p(x)p(x + D)\})}{( \; c\{p(x)p(x + D)\})} \right)$$

where $PTF(f) = (\lambda/2\pi)\alpha W(x,D)$

Thus, the OTF can be expressed in polar form as $$OTF(f) = MTF(f)e^{jPTF(f)} \quad (4)$$

In the diffraction limited case, the PTF part is zero end 4 reduces to $$OTF_D(f) = MTF_D(f) \quad (5)$$

Equations 4 and 5 represent the global or full aperture OTF for the general and diffraction limited case respectively. A complex OQF can now be defined as $$OQF^*(f) = \frac{OTF(f)}{OTF_D(f)} = \frac{MTF(f)e^{jPTF(f)}}{MTF_D(f)} = OQF(f)e^{jPTF(f)} \quad (6)$$

To this point, only global transfer functions end OQF have been discussed. Similar results ere derived for local pupil regions in the following sections.

Figure 24:
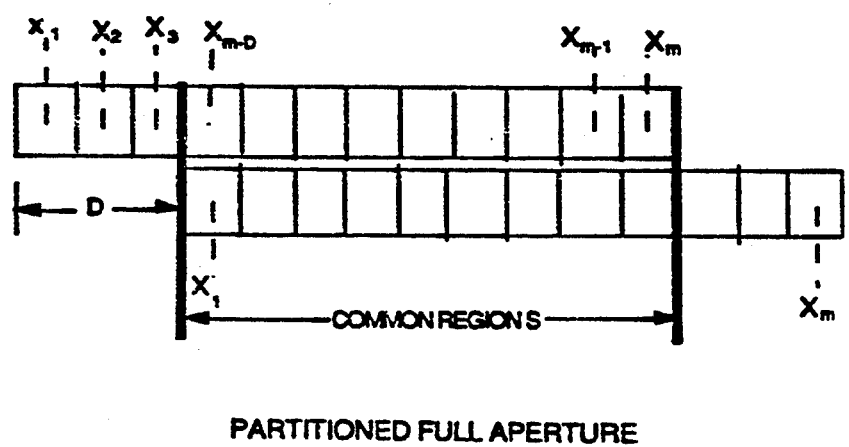
FIG. 24 shows an example full aperture in the form of a 1-dimensional rectangular slit.

FIG. 24 presents an example full aperture in the form of a 1-dimensional rectangular slit for exemplary purposes-results ere extendable to 2-D As shown, the full or global aperture of FIG. 1A is partitioned into m subapertures where Xp represents the central coordinate of the p-th subaperture. The shifted aperture is also shown in FIG. 1B for the demonstration of the autocorrelation process. The OTF is obtained, by the integration over the common region, as shown in the figure, of the shifted and unshifted pupils. Since the example aperture is partitioned, a local OTF can be defined for each of the m-D common subaperture Him. The OTF for the I)-th subaperture is composed of sample regions at coordinates Xp and Xp+D. The local OTF for that part of the pupil circumscribed by this pair of sample apertures is then $$OTF_p(f) = \int_{S_p} p(x_p)p^*(x_{p+D})e^{jk\Delta W(x_p,D)}dx \quad (7)$$

Equation 7 gives the p-th local OQF for common regions defined over Sp -the Intersection of regions located at coordinates Xp end Xp+D.

The paired local subapertures In the common region of FIG. 1 define a system of Young's sampling apertures. For example, subapertures $X_1$ and $X_{1+D}$, $X_2$ and $X_{2+D}$, etc. form a set of Young's interferometers, wherein each pair within the set have a fixed separation distance $D = \lambda z f^*$. In essence, each pair evaluates the quality of the full aperture on the basis of m-D discrete subaperture pairs of the common region.

From equation's 2 and 7, the global OTF is expressed in terms of local pupil contributions as $$OTF(f) = \frac{1}{A} \sum_{p=1}^{m} \int_{S_p} p(x_p)p^*(x_{p+D})e^{jk\Delta W(x_p,D)}dx \quad (8)$$

The corresponding diffraction limited case is $$OTF_D(f) = \frac{1}{A} \sum_{p=1}^{m} \int_{S_p} p(x_p)p^*(x_{p+D})dx = \ldots = \quad (9)$$

$$(m/A)OTF_p(f) = (m/A)MTF_p(f)$$

The global OQF is computed as $OQF(f) = OTF(f)/OTF_D(f)$; thus, from equation's 8 and 9 we get the global OQF in terms of subapertures $$OQF(f) = \frac{\frac{1}{A} \sum_{p=1}^{m} \int_{S_p} p(x_p)p^*(x_p+D)e^{jk\Delta W(x_p,D)}dx}{\frac{1}{A} \sum_{p=1}^{m} \int_{S_p} p(x_p)p^*(x_p+D)dx}$$

Substitution of equation 4 and 5 gives a simplified expression for the global OQF as $$OQF(f) = \frac{\sum_{p=1}^{m} MTF_p(f)e^{jkPTF_p(f)}}{(m)MTF_{D,p}(f)}$$

where $MTF_{D,p}(f)$ is the diffraction-limited MTF for the p-th Young's subaperture pair. Arithmetic operations lead to the following simplified formulas $$OQF(f) = \frac{1}{m} \sum_{p=1}^{m} \left( \frac{MTF_p(f)}{MTF_{D,p}(f)} \right) e^{jkPTF_p(f)} = \ldots =$$

$$\frac{1}{m} \sum_{p=1}^{m} (OQF_p(f))e^{jkPTF_p(f)}.$$

This equation demonstrates that the global OQF can be represented as the vector or phasor sum of the local complex OQF results. Finally, Euler's formula can be used to give the following computationally convenient form for the global OQF $$OQF(f) = \left[ \left( \frac{1}{m} \sum_{p=1}^{m} OQF_p(f)\cos(kPTF_p(f)) \right)^2 + \left( \frac{1}{m} \sum_{p=1}^{m} OQF_p(f)\sin(kPTF_p(f)) \right)^2 \right]^{\frac{1}{2}}$$

This equation was used in obtaining the table IV results. The summation components for the first term is denoted as OQF X C(PTF).

What is claimed is:

1. A method for providing correction feedback for an imaging assembly comprising a lens or mirror and at least two components, which imaging assembly can image a radiation beam, which method comprises:
   1) sampling a pupil of the imaging assembly at at least two regions for assessing wavefront errors associated with at least two regions;
   2) computing a localized optical transfer function (LOTF) for the localized wavefront errors; the LOTF being defined by an equation:

$$LOTF_{freq} = LMTF_{freq} \times e^{(j)LPTF_{freq}}$$

where
   $LOTF_{freq}$ = Local Optical Transfer Function at frequency freq;
   $LMTF_{freq}$ = Local Modulation Transfer Function at frequency freq;
   $LPTF_{freq}$ = Local Phase Transfer Function at frequency freq;
   3) generating from the LOTF a performance map comprising
      a) a local optical quality factor (LOQF) comprising the ratio $$\frac{\text{the computed } LMTF}{\text{a diffraction limited } LMTF} \text{; and,}$$

b) the local phase transfer function (LPTF); and,
   4) generating from the performance map correction feedback comprising inter-component difference errors, for applying a controlled action to at least one of the components.

2. A method according to claim 1, wherein step (1) comprises sampling the pupil with an opaque mask defining at least two apertures.

3. A method according to claim 2, comprising sampling a cross-section of the pupil.

* * * * *